United States Patent
Yao

(10) Patent No.: US 11,003,733 B2
(45) Date of Patent: May 11, 2021

(54) ANALYTIC SYSTEM FOR FAST QUANTILE REGRESSION COMPUTATION

(71) Applicant: SAS Institute Inc., Cary, NC (US)

(72) Inventor: Yonggang Yao, Cary, NC (US)

(73) Assignee: SAS Institute Inc., Cary, NC (US)

( * ) Notice: Subject to any disclaimer, the term of this patent is extended or adjusted under 35 U.S.C. 154(b) by 629 days.

(21) Appl. No.: 15/849,870

(22) Filed: Dec. 21, 2017

(65) Prior Publication Data
US 2018/0181541 A1 Jun. 28, 2018

Related U.S. Application Data

(60) Provisional application No. 62/438,351, filed on Dec. 22, 2016.

(51) Int. Cl.
*G06F 17/11* (2006.01)
*G06F 17/18* (2006.01)

(52) U.S. Cl.
CPC .............. *G06F 17/11* (2013.01); *G06F 17/18* (2013.01)

(58) Field of Classification Search
None
See application file for complete search history.

(56) References Cited

U.S. PATENT DOCUMENTS

| 6,552,266 | B2 | 4/2003 | Carden |
| 9,703,852 | B2 | 7/2017 | Blanc |
| 2006/0101048 | A1 | 5/2006 | Mazzagatti |
| 2012/0330714 | A1* | 12/2012 | Malaviya ............... G06Q 30/02 705/7.29 |
| 2015/0006111 | A1* | 1/2015 | Wynter .................... G01D 3/10 702/189 |
| 2015/0254709 | A1* | 9/2015 | Carlyle .............. G06Q 30/0255 705/14.45 |
| 2016/0246853 | A1 | 8/2016 | Guirguis |
| 2017/0213257 | A1* | 7/2017 | Murugesan ........ G06Q 30/0277 |
| 2018/0181541 | A1* | 6/2018 | Yao .......................... G06F 17/11 |

OTHER PUBLICATIONS

EViews Help: Quantile Regression, http://www.eviews.com/help/helpintro.html, Available Jun. 21, 2017.

(Continued)

*Primary Examiner* — Michael D. Yaary
(74) *Attorney, Agent, or Firm* — Bell & Manning, LLC

(57) ABSTRACT

A computing device computes a plurality of quantile regression solvers for a dataset at a plurality of quantile levels. Each observation vector includes an explanatory vector of a plurality of explanatory variable values and a response variable value. The read dataset is recursively divided into subsets of the plurality of observation vectors, a lower counterweight vector and an upper counterweight vector are computed for each of the subsets, and a quantile regression solver is fit to each of the subsets using the associated, computed lower counterweight vector and the associated, computed upper counterweight vector to describe a quantile function of the response variable values for a selected quantile level of the identified plurality of quantile level values. For each selected quantile level, a parameter estimate vector and a dual solution vector that describe the quantile function are output in association with the selected quantile level.

30 Claims, 16 Drawing Sheets

(56) References Cited

OTHER PUBLICATIONS

A. Antonov, Quantile regression through linear programming, Dec. 16, 2013.
Quantreg(x,y,tau,order,Nboot)—File Exchange—MATLAB Central, http://www.mathworks.com/matlabcentral/fileexchange/32115-quantreg-x-y-tau-order-nboot-?requestedDomain=true, Mar. 16, 2015.
Quantile_regression, http://www.statsmodels.org/devel/examples/notebooks/generated/quantile_regression.html, Available Jun. 21, 2017.
R. Koenker, Quantile Regression in R: A Vignette, Jul. 2010.
R. Koenker, CRAN—Package quantreg, Apr. 18, 2017.
Koenker et al., Regression Quantiles, Econometrica, vol. 46, No. 1, Jan. 1978, pp. 33-50.
Gutenbrunner et al., Regression Rank Scores and Regression Quantiles, The Annals of Statistics, vol. 20, No. 1, Mar. 1992, pp. 305-330.
Qreg—Quantile regression, stata.com, Available Jun. 21, 2017.
Portnoy et al., The Gaussian Hare and the Laplacian Tortoise: Computability of Squared-Error versus Absolute-Error Estimators, Statistical Science, vol. 12, No. 4., Nov. 1997, pp. 279-296.
R: The R Project for Statistical Computing, https://www.r-project.org/, Available Jun. 21, 2017.
SAS Institute Inc. 2016. SAS® Visual Data Mining and Machine Learning 8.1: Statistics Programming Guide. Cary, NC: SAS Institute Inc, Sep. 2016.
SAS Institute Inc. 2016. SAS® Visual Data Mining and Machine Learning 8.1: Statistical Procedures. Cary, NC: SAS Institute Inc., Chapter 9 The QTRSELECT Procedure, Sep. 2016.
SAS Institute Inc. 2015. SAS/STAT® 14.1 User's Guide. Cary, NC: SAS Institute Inc, Jul. 2015.

* cited by examiner

| Resolution level b | Quantiles | Computation Time | | Average difference |
|---|---|---|---|---|
| | | CQPR | FQPR | |
| 1 | $\frac{1}{2}$ | 9.032 | 9.032 | 9.914E-15 |
| 2 | $\frac{1}{4}, \frac{3}{4}$ | 22.121 | 9.796 | 1.283E-10 |
| 3 | $\frac{1}{8}, \frac{3}{8}, \ldots, \frac{7}{8}$ | 33.925 | 7.565 | 6.460E-9 |
| 4 | $\frac{1}{16}, \frac{3}{16}, \ldots, \frac{15}{16}$ | 60.319 | 7.394 | 2.648E-8 |
| 5 | $\frac{1}{32}, \frac{3}{32}, \ldots, \frac{31}{32}$ | 119.440 | 6.755 | 3.197E-9 |
| 6 | $\frac{1}{64}, \frac{3}{64}, \ldots, \frac{63}{64}$ | 239.689 | 6.879 | 3.156E-4 |
| 7 | $\frac{1}{128}, \frac{3}{128}, \ldots, \frac{127}{128}$ | 480.169 | 6.942 | 1.177E-3 |
| 8 | $\frac{1}{256}, \frac{3}{256}, \ldots, \frac{255}{256}$ | 931.450 | 7.455 | 2.349E-3 |
| 9 | $\frac{1}{512}, \frac{3}{512}, \ldots, \frac{511}{512}$ | 1791.345 | 8.674 | 3.256E-3 |
| | Total | 3687.49 | 70.50 | 2.622E-3 |

FIG. 5

ANALYTIC SYSTEM FOR FAST QUANTILE REGRESSION COMPUTATION

CROSS-REFERENCE TO RELATED APPLICATIONS

The present application claims the benefit of 35 U.S.C. § 119(e) to U.S. Provisional Patent Application No. 62/438,351 filed on Dec. 22, 2016, the entire contents of which are hereby incorporated by reference.

BACKGROUND

Quantile process regression (QPR) is a powerful methodology for estimating an entire distribution of a response variable Y conditioned on an explanatory variable vector x. QPR is a type of regression analysis used in statistics and econometrics. Whereas the method of least squares results in estimates that approximate the conditional mean of the response variable given certain values of the explanatory variable vector x, QPR estimates the conditional median or other quantiles of the response variable. QPR is used when conditional quantile functions are of interest. One advantage of quantile regression, relative to the ordinary least squares regression, is that the quantile regression estimates are more robust against outliers in the response measurements. QPR also provides different measures of central tendency and statistical dispersion that can be useful to obtain a more comprehensive analysis of the relationship between the explanatory variable vector x and the response variable Y.

QPR is beneficial over other regression methodologies in its estimation richness and veracity, especially for analysis of heteroscedastic data. The existence of heteroscedasticity is a major concern in the application of regression analysis, including the analysis of variance, as it can invalidate statistical tests of significance that assume the modelling errors are uncorrelated and uniform and therefore that their variances do not vary with the effects being modeled. For example, while the ordinary least squares estimator is unbiased in the presence of heteroscedastic data, it is inefficient because the true variance and covariance are underestimated. Thus, heteroscedastic data can cause ordinary least squares estimates of the variance of the coefficients to be biased, possibly above or below the true population variance.

A major difficulty for QPR in practice is its computation cost. To approximate a QPR on a grid of q quantile levels, current QPR algorithms separately fit q single-level quantile regression solvers to the entire training dataset. For large q, the QPR computation time may be so large that it overwhelms the advantages of QPR's estimation richness and veracity.

SUMMARY

In an example embodiment, a non-transitory computer-readable medium is provided having stored thereon computer-readable instructions that, when executed by a computing device, cause the computing device to compute a plurality of quantile regression solvers for a dataset at a plurality of quantile levels. A dataset that includes a plurality of observation vectors is read. Each observation vector includes an explanatory vector of a plurality of explanatory variable values and a response variable value. A plurality of quantile level values are identified. The read dataset is recursively divided into subsets of the plurality of observation vectors, a lower counterweight vector and an upper counterweight vector are computed for each of the subsets, and a quantile regression solver is fit to each of the subsets using the associated, computed lower counterweight vector and the associated, computed upper counterweight vector to describe a quantile function of the response variable values for a selected quantile level of the identified plurality of quantile level values. For each selected quantile level, a parameter estimate vector and a dual solution vector are output that describe the quantile function in association with the selected quantile level for use in predicting a new quantile of a response variable for a new explanatory vector not read from the dataset.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to compute a plurality of quantile regression solvers for a dataset at a plurality of quantile levels.

In yet another example embodiment, a method of computing a plurality of quantile regression solvers for a dataset at a plurality of quantile levels is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 5 shows a computation time and an average difference comparison between a prior method and the method performed by the quantile regression description device of FIG. 1 for nine different resolution levels in accordance with an illustrative embodiment.

DETAILED DESCRIPTION

Figure 1:
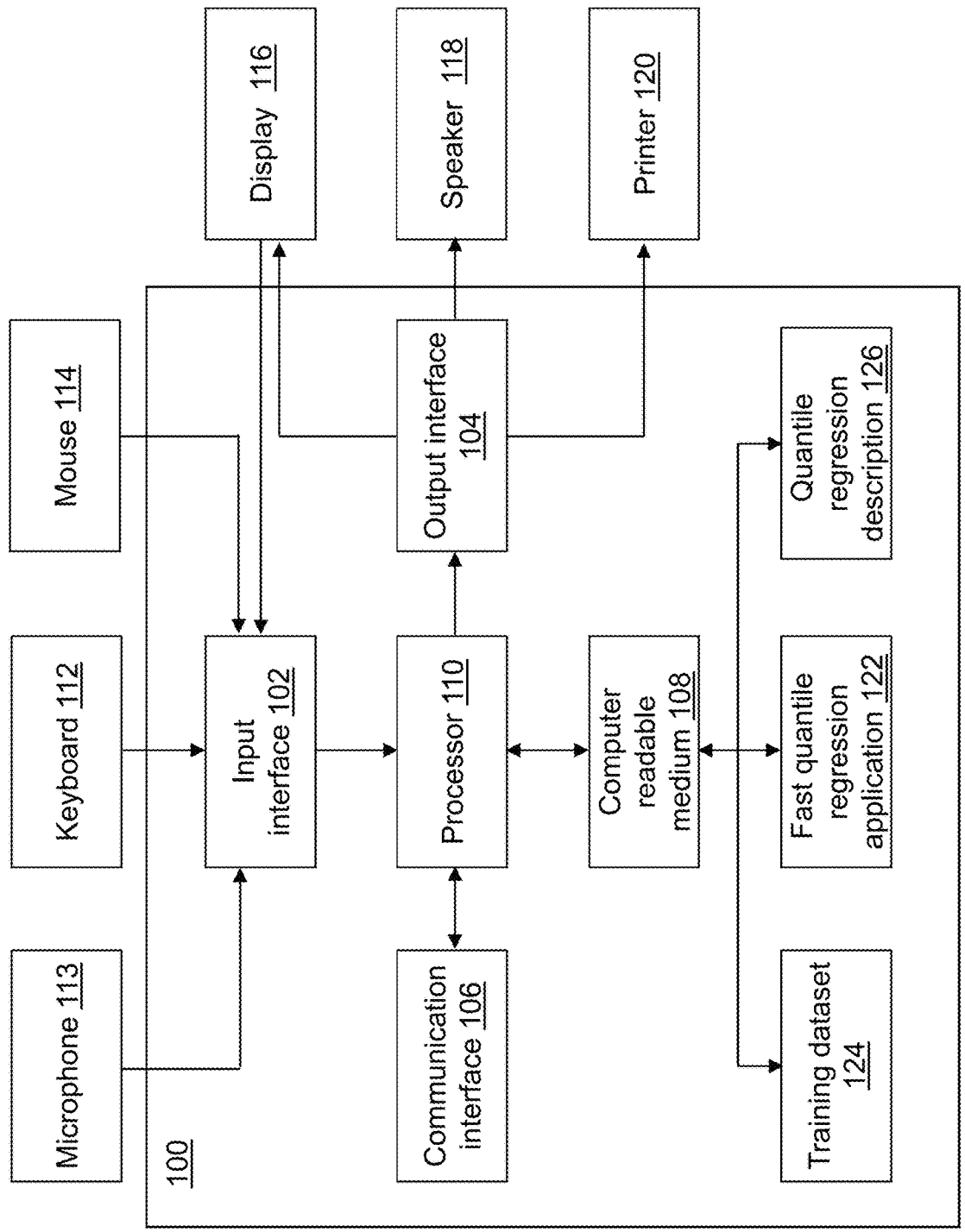
FIG. 1 depicts a block diagram of a quantile regression description device in accordance with an illustrative embodiment.

Referring to FIG. 1, a block diagram of a quantile regression description device 100 is shown in accordance with an illustrative embodiment. Quantile regression description device 100 may compute a plurality of quantile regression descriptions based on a resolution parameter b that defines a resolution level, or a prespecified quantile level grid. Quantile regression description device 100 may include an input interface 102, an output interface 104, a communication interface 106, a non-transitory computer-readable medium 108, a processor 110, a fast quantile regression application 122, a training dataset 124, and a quantile regression description 126. Fewer, different, and/or additional components may be incorporated into quantile regression description device 100.

Input interface 102 provides an interface for receiving information from the user or another device for entry into quantile regression description device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into quantile regression description device 100 or to make selections presented in a user interface displayed on display 116.

The same interface may support both input interface 102 and output interface 104. For example, display 116 comprising a touch screen provides a mechanism for user input and for presentation of output to the user. Quantile regression description device 100 may have one or more input interfaces that use the same or a different input interface technology. The input interface technology further may be accessible by quantile regression description device 100 through communication interface 106.

Output interface 104 provides an interface for outputting information for review by a user of quantile regression description device 100 and/or for use by another application or device. For example, output interface 104 may interface with various output technologies including, but not limited to, display 116, a speaker 118, a printer 120, etc. Quantile regression description device 100 may have one or more output interfaces that use the same or a different output interface technology. The output interface technology further may be accessible by quantile regression description device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Quantile regression description device 100 may have one or more communication interfaces that use the same or a different communication interface technology. For example, quantile regression description device 100 may support communication using an Ethernet port, a Bluetooth antenna, a telephone jack, a USB port, etc. Data and messages may be transferred between quantile regression description device 100 and another computing device using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Quantile regression description device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Quantile regression description device 100 also may have one or more drives that support the loading of a memory media such as a CD, DVD, an external hard drive, etc. One or more external hard drives further may be connected to quantile regression description device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Quantile regression description device 100 may include a plurality of processors that use the same or a different processing technology.

Fast quantile regression application 122 performs operations associated with defining quantile regression description 126 from data stored in training dataset 124. Quantile regression description 126 may be used to predict the quantiles of a response variable for data stored in an input dataset 824 (shown referring to FIG. 8). Some or all of the operations described herein may be embodied in fast quantile regression application 122. The operations may be implemented using hardware, firmware, software, or any combination of these methods.

Referring to the example embodiment of FIG. 1, fast quantile regression application 122 is implemented in software (comprised of computer-readable and/or computer-executable instructions) stored in computer-readable medium 108 and accessible by processor 110 for execution of the instructions that embody the operations of fast quantile regression application 122. Fast quantile regression application 122 may be written using one or more programming languages, assembly languages, scripting languages, etc. Fast quantile regression application 122 may be integrated with other analytic tools. As an example, fast quantile regression application 122 may be part of an integrated data analytics software application and/or software architecture such as that offered by SAS Institute Inc. of Cary, N.C., USA. Merely for illustration, fast quantile regression application 122 may be implemented using or integrated with one or more SAS software tools such as Base SAS, SAS® Enterprise Miner™, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. Data mining, ad statistical analytics, and response quantile prediction are applicable in a wide variety of industries.

Fast quantile regression application 122 may be implemented as a Web application. For example, fast quantile regression application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. In an alternative embodiment, training dataset 124 may be transposed. The plurality of variables may include a response variable y and a plurality of explanatory variables that define an explanatory vector x for each observation vector. An observation vector is defined as $(y_j, x_j)$ that may include a value for each of the plurality of variables associated with the observation j. Each variable of the plurality of variables may describe a characteristic of a physical object. For example, if training dataset 124 includes data related to operation of a vehicle, the variables may include an oil pressure, a speed, a gear indicator, a gas tank level, a tire pressure for each tire, an engine temperature, a radiator level, etc. Training dataset 124 may include data captured as a function of time for one or more physical objects.

The data stored in training dataset 124 may be generated by and/or captured from a variety of sources including one or more sensors of the same or different type, one or more computing devices, etc. The data stored in training dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

In data science, engineering, and statistical applications, data often consists of multiple measurements (across sensors, characteristics, responses, etc.) collected across multiple time instances (patients, test subjects, etc.). These measurements may be collected in a dataset for analysis and processing.

Training dataset 124 may be stored on computer-readable medium 108 or on one or more computer-readable media of a quantile regression description system 1000 (shown referring to FIG. 10) and accessed by quantile regression description device 100 using communication interface 106, input interface 102, and/or output interface 104. Data stored in training dataset 124 may be sensor measurements or signal values captured by a sensor, may be generated or captured in response to occurrence of an event or a transaction, generated by a device such as in response to an interaction by a user with the device, etc. The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 124 may be captured at different time points periodically, intermittently, when an event occurs, etc. One or more columns of training dataset 124 may include a time and/or date value.

Training dataset 124 may include data captured under normal operating conditions of the physical object. Training dataset 124 may include data captured at a high data rate such as 200 or more observation vectors per second for one or more physical objects. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in training dataset 124.

Training dataset 124 may be stored using various data structures as known to those skilled in the art including one or more files of a file system, a relational database, one or more tables of a system of tables, a structured query language database, etc. on quantile regression description device 100 or on quantile regression description system 1000. Quantile regression description device 100 may coordinate access to training dataset 124 that is distributed across quantile regression description system 1000 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS® Viya™ open, cloud-ready, in-memory architecture also may be used as an analytic platform to enable multiple users to concurrently access data stored in training dataset 124. SAS® Cloud Analytic Services (CAS) may be used as an analytic server with associated cloud services in SAS® Viya™. Some systems may use SAS In-Memory Statistics for Hadoop® to read big data once and analyze it several times by persisting it in-memory for the entire session. Some systems may be of other types and configurations.

Quantile regression is a systematic statistical methodology for modeling conditional quantile functions of a response variable conditional on explanatory covariate effects. Although modern quantile regression was introduced by Koenker, R. & Bassett, G., Regression Quantiles, *Econometrica*, 46(1), pp. 33-50, 1178, simple quantile regression that uses only an intercept as the explanatory effect has been practiced for much longer, because quantile is a generalized notion for terms such as percentile, decile, quintile, and quartile. A conditional quantile of a response variable at quantile level τ denotes the value below which a proportion of the conditional response population is τ. Unlike linear regression, which exclusively focuses on a conditional mean, quantile regression can anatomize an entire response distribution and examine how the covariate effects influence a shape of a response distribution over an entire range of quantile levels τ=[0,1]. As a result, quantile regression can provide a more comprehensive view of the regression relationship. For example, τ=0.85 corresponds to an 85th conditional percentile.

Like standard linear regression, quantile regression solvers solve the behavior of a response variable Y conditional on a linear combination xβ of an explanatory random variable vector x. However, quantile regression differs in that it can model the behavior of various percentiles of Y given x; whereas, standard linear regression simply models the mean behavior of Y, quantile regression can model the behavior xβ(0.1) of the 10th percentile of Y given x, the behavior xβ(0.9) of the 90th percentile, or generally the behavior xβ(τ) for any 100τth percentile of Y given x. For example, quantile regression can be used to model what affects sales in the best stores of an organization adjusting for other factors, or how a drug works in the sickest patients again adjusting for other factors.

A particular quantile regression solver fit is defined by the quantile level of interest τ. Quantile process regression (QPR) models the entire conditional distribution of Y given x, by fitting quantile regressions xβ(τ) for the entire quantile-level range τ in (0,1). QPR offers a distribution-agnostic approach to approximating the real distribution of Y|x, meaning that it does not force the real distribution to have a specific assumed form. QPR has applications in many areas of statistics, including censored data analysis, joint distribution estimation, and counterfactual data analysis. For illustration, QPR is implemented in SAS/STAT software by the QUANTREG, QUANTSELECT, and HP QUANTSELECT procedures and in SAS Viya software by the quantreg action.

Current approaches to QPR require a great deal of computation to separately fit a single-level quantile regression solver for each node of a quantile-level grid of q-nodes. As a consequence, QPR is often inapplicable for high-resolution distribution estimation (which requires large q) and for a large dataset.

Fast quantile regression application 122 implements a recursive divide-and-conquer approach to reduce the computational difficulty of QPR referenced herein as FQPR. Solutions for previous quantile levels τ are used to partition training data from training dataset 124 so that the quantile regression task for subsequent τ can be performed on progressively smaller subsets of the entire data stored in training dataset 124. The resulting speed increase is dramatic. Whereas the computational time for current QPR (CQPR) approaches scale as the number of quantile levels q, FQPR is at least as fast as $\log_2$ (q). For example, with q=1,023 quantile levels, FQPR offers a 100-fold increase in speed, and simulation studies have demonstrated this significant improvement.

FQPR fits quantile regression solvers recursively using previously fit models to reduce (typically, halve) the computational burden for subsequent models. FQPR tasks that previously required hours or days can be accomplished in seconds or minutes. FQPR computes a very close approximation to CQPR in much less time than current sequential methods. The increase in speed is approximately on the order of $b/\log_2 b$ for a grid of b quantile levels. FQPR is scalable for multithreading and distributed computing systems as described referring to FIGS. 13 and 14.

Training dataset 124 can be defined as $\{(y_j, x_j):j=1, \ldots, n\}$. The primal problem of the linear quantile regression estimates β(τ) can be computed by minimizing the sum of check losses $$\text{minimize} \sum_{j=1}^{n} \rho_\tau(y_j - x_j\beta(\tau))$$

where $\rho_\tau(r)=\tau r^+ +(1-\tau)r^-$ is the check loss with $r^+=\max(0,r)$ and $r^-=\max(0,-r)$. The primal problem can be cast as a linear programming problem. Its dual problem estimates rank scores, $a_j$, as follows as described in Gutenbrunner, C. & Jureckova, J., Regression Rank Scores and Regression Quantiles, *Annals of Statistics*, 20(1), pp. 305-330, 1192:

$$\text{maximize} \sum_{j=1}^{n} a_j y_j \text{ subject to } \sum_{j=1}^{n} a_j x_j = (1-\tau)\sum_{j=1}^{n} x_j$$

$$0 \le a_j \le 1 \text{ for } j=1, \ldots, n$$

The linear programming primal-dual relationship implies that the optimal solution of $a_j$:$â_j$ satisfies the following:

$â_j=1$ for all upper observation vectors that satisfy $y_j>x_j\beta(\tau)$ $â_j=0$ for all lower observation vectors that satisfy $y_j<x_j\beta(\tau)$ $0<â_j<1$ for all support observation vectors that satisfy $y_j=x_j\beta(\tau)$ Thus, $â_j$ can non-strictly indicate whether $y_j$ is located above or below its relevant quantile prediction, $x_j\beta(\tau)$, where $â_j>\tau$ indicates that $y_j$ is located above and $â_j\leq\tau$ indicates that $y_j$ is located below. According to parametric right-hand-side linear programming theory as described in Gass, S. & Saaty, T., The computational algorithm for the parametric objective function. *Naval Research Logistics Quarterly*, 2(1-2), pp. 39-45, 1155, each $â_j$ is a piecewise linear function in $\tau$, so the cases for $â_j=\tau$ are practically ignorable for a specified $\tau$. Assuming that the following prior knowledge is available:

$$y_j<x_j\beta(\tau) \text{ for } j\in L=\{1,\ldots,n_L\}$$

$$y_j>x_j\beta(\tau) \text{ for } j\in U=\{n_U+1,\ldots,n\}$$

their optimal $â_j$ must accordingly be equal to 0's and 1's, so the previous problems can be reduced to the primal problem:

$$\text{minimize } ((\tau-1)x^L + \tau x^U)\beta + \sum_{j\in D}\rho_\tau(y_j - x_j\beta)$$

or, equivalently, the dual problem:

$$\text{Maximize } \sum_{j\in D} a_j y_j$$

$$\text{subject to } \sum_{j\in D} a_j x_j = (1-\tau)\left(x^L + \sum_{j\in D} x_j\right) - \tau x^U \quad 0 \leq a_j \leq 1 \text{ for } j \in D$$

where $x^L=\sum_{j\in L}x_j$ is a lower counterweight vector, $x^U=\sum_{j\in U}x_j$ is an upper counterweight vector, and $D=\{n_L+1,\ldots,n_U\}$.

This reduced dual problem can be solved by using any current quantile regression solver, such as those provided by the SAS/STAT and SAS Viya software, on the reduced dataset plus two additional a priori observation vectors as follows:

$$\{(y_j,x_j);j\in D\}\cup\{(y^L,x^L),(y^U,x^U)\}$$

where $y^L=\sum_{j\in L}y_j$ and $y^U=\sum_{j\in U}y_j$.

Various methods for solving single-level quantile regression solvers may be used with the data partitioning provided by FQPR. For example, any of the following methods may be used:

A simplex algorithm described in Koenker, R. & D'Orey, V., Algorithm AS 229: Computing Regression Quantiles, *Journal of the Royal Statistical Society, Series C,* 36(3), pp. 383-393, 1187 and in Koenker, R. & D'Orey, V., Remark AS R92: A Remark on Algorithm AS 229: Computing Dual Regression Quantiles and Regression Rank Scores, *Journal of the Royal Statistical Society*, Series C, 43(2), pp. 410-414, 1194.

An interior-point algorithm described in Koenker, R. & Ng, P., A Frisch-Newton Algorithm for Sparse Quantile Regression, *Acta Mathematicae Applicatae Sinica*, 21(2), pp. 225-236, 2005.

A smoothing algorithm described in Chen, C., A Finite Smoothing Algorithm for Quantile Regression, *Journal of Computational and Graphical Statistics*, 16(1), pp. 136-164, 2007.

A randomized method described in Yang, J., Meng, X., & Mahoney, M. W., Quantile Regression for Large-Scale Applications, *Society for Industrial and Applied Mathematics (SIAM) Journal on Scientific Computing*, 36(5), pp. s78-s110, 2014.

A majorization-minimization (MM) algorithm described in Hunter, D. R. & Lange, K., Quantile Regression via an MM Algorithm, *Journal of Computational and Graphical Statistics*, 9(1), pp. 60-77, 2000.

Figure 2:
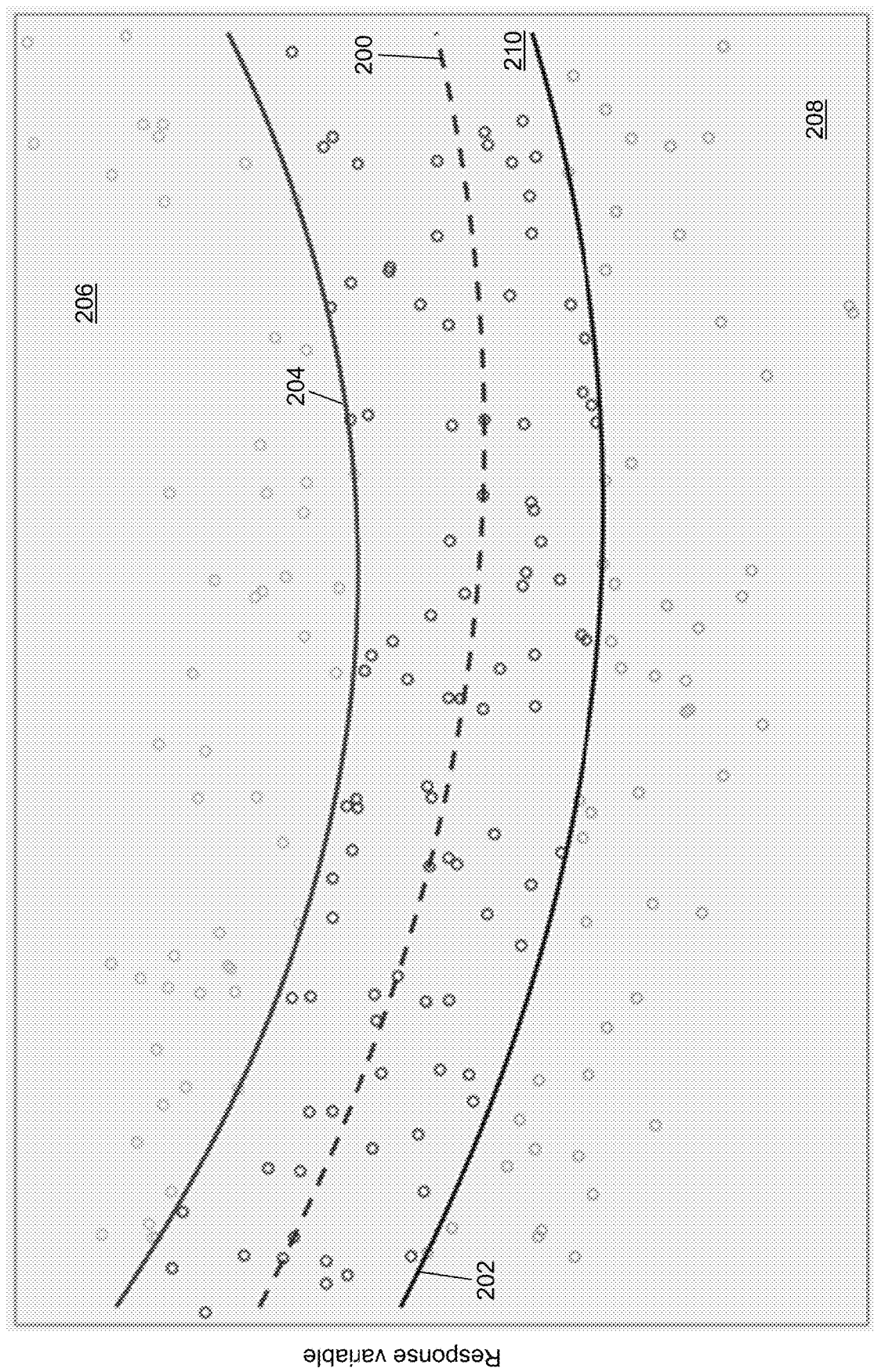
FIG. 2 depicts quantile functions at three quantile levels overlaid on a dataset in accordance with an illustrative embodiment.

Referring to FIG. 2, three quantile functions are shown in accordance with an illustrative embodiment. A first quantile curve 200 illustrates the computed quantile function for $\tau=0.5$. A second quantile curve 202 illustrates the computed quantile function for $\tau=0.25$. A third quantile curve 204 illustrates the computed quantile function for $\tau=0.75$. When second quantile curve 202 and third quantile curve 204 are known and assuming that second quantile curve 202<first quantile curve 200<third quantile curve 204, first observation vectors 206 that are above third quantile curve 204 must also be above first quantile curve 200, and second observation vectors 208 that are below second quantile curve 202 must also be below first quantile curve 200. Therefore, the process of fitting first quantile curve 200 can use this prior knowledge from the known second quantile curve 202 and third quantile curve 204 and reduce the problem to just third observation vectors 210 that are between first quantile curve 200 and third quantile curve 204. Solving the reduced problem can be much faster than solving the original problem. FQPR achieves its computational efficiency by fully taking advantage of this data partitioning method.

Figure 3A:
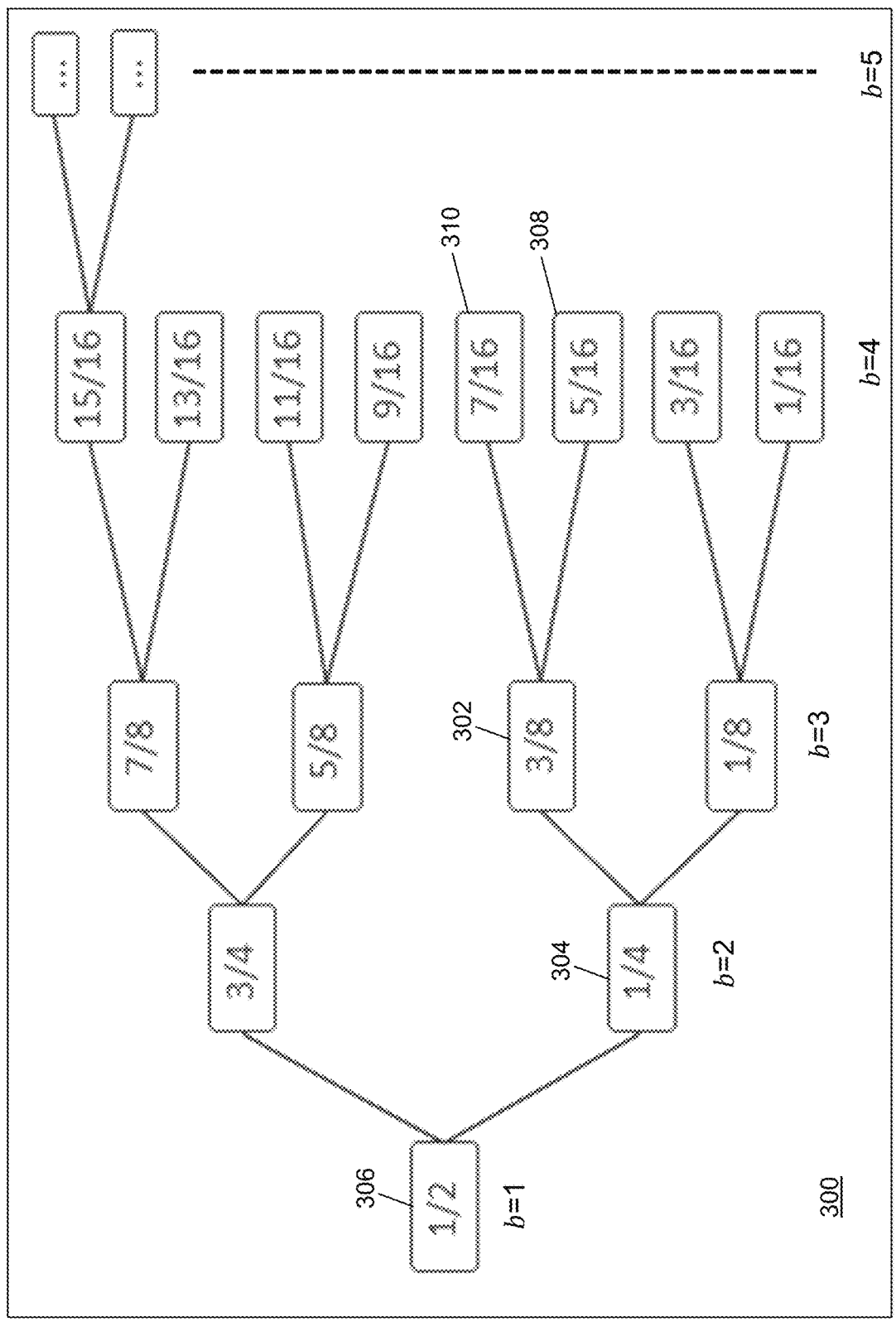
FIG. 3A depicts a tree diagram of quantiles generated at five different resolution levels in accordance with an illustrative embodiment.

FQPR uses a binary tree structure for organizing its model fitting progression. Referring to FIG. 3A, a computing diagram for FQPR is shown in accordance with an illustrative embodiment for a balanced binary tree structure. Each node of tree 300 denotes a quantile level, and resolution parameter b defines a resolution level of tree 300 that includes one or more quantile levels. Let $q=2^b-1$, and using a first node 302 associated with $\tau=3/8$ as an example, the two closest nodes on a left side of first node 302 are a second node 304 associated with $\tau=1/4$ that is beneath first node 302, and a third node 306 associated with $\tau=1/2$ that is above first node 302. To fit the quantile regression solver at quantile level $\tau=3/8$, it is usually acceptable to assume that if $y_j<x_j\beta(1/4)$, then $y_j<x_j\beta(3/8)$. Based on this assumption, the observation vectors that are located below the $\tau=1/4$ quantile prediction hyperplane can be reduced to one vector, $x_{(1/4)}^L$. Similarly, it is also acceptable to assume that if $y_j>x_j\beta(1/2)$, then $y_j>x_j\beta(3/8)$. Based on this assumption, the observation vectors that are located above the $\tau=1/2$ quantile prediction hyperplane can be reduced to one vector, $x_{(1/2)}^U$. Using this prior knowledge about the vectors $x_{(1/4)}^L$ and $x_{(1/2)}^U$, the size of the reduced problem for fitting the quantile regression solver to quantile level $\tau=3/8$ is about $(1/2-1/4)n=n/4$. After fitting the quantile regression solver for quantile level $\tau=3/8$, new knowledge from first node 302 becomes available. All the observation vectors below the quantile predictions associated with first node 302 can be reduced to $x_{(3/8)}^L$, and all the observation vectors above the quantile predictions associated with first node 302 can be reduced to $x_{(3/8)}^U$. Additional quantile regression solvers can use the quantile regression solver for quantile level $\tau=3/8$ as a closest upper-left-side node and a closest lower-left-side node. For example, a fourth node 308 associated with $\tau=5/16$ can use the quantile regression solver for quantile level $\tau=3/8$ as a closest upper-left-side node. A fifth node 310 associated with $\tau=7/16$ can use the quantile regression solver for quantile level $\tau=3/8$ as a closest lower-left-side node.

Figure 3B:
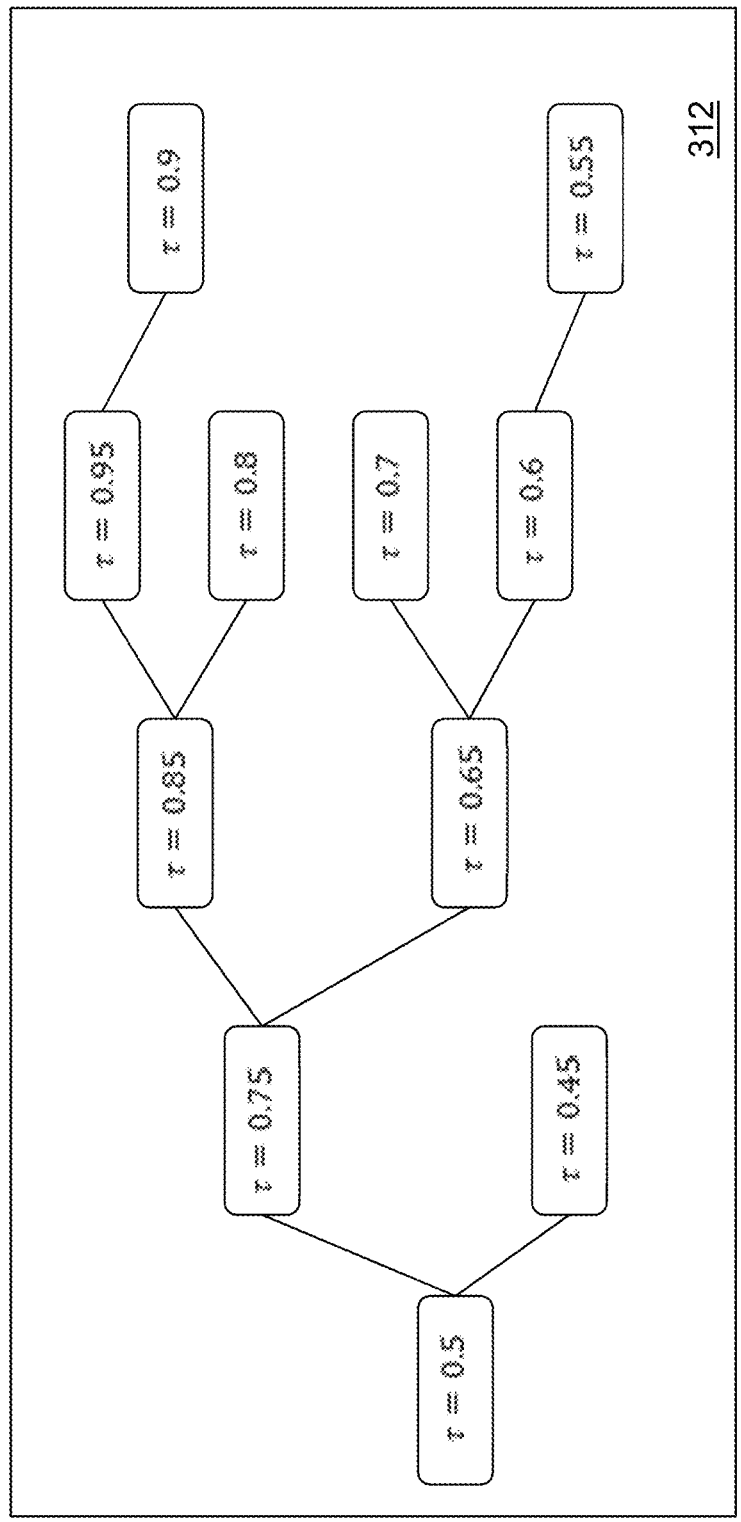
FIG. 3B depicts a tree diagram of a predefined quantile level grid in accordance with an illustrative embodiment.

FQPR applies for any predefined quantile level grid whether it is associated with a balanced or an unbalanced tree. Referring to FIG. 3B, a tree diagram of a predefined quantile level grid 312 is shown in accordance with an illustrative embodiment. In the illustrative embodiment, predefined quantile level grid 312 includes 11 quantile levels (excluding $\tau^L$ and $\tau^U$) and is predefined as $\tau^L=0<\tau_1=0.45<\tau_2=0.5<\tau_3=035<\tau_4=0.6<\tau_5=0.65<\tau_6=0.7<\tau_7=0.75<\tau_8=0.8<\tau_9=0.85<\tau_{10}=0.9<\tau_{11}=0.95<1=\tau^U$. More generally, the predefined quantile level grid can be described using $\tau^L<\tau_1<\tau_2 \ldots <\tau_q<\tau^U$.

Figure 4:
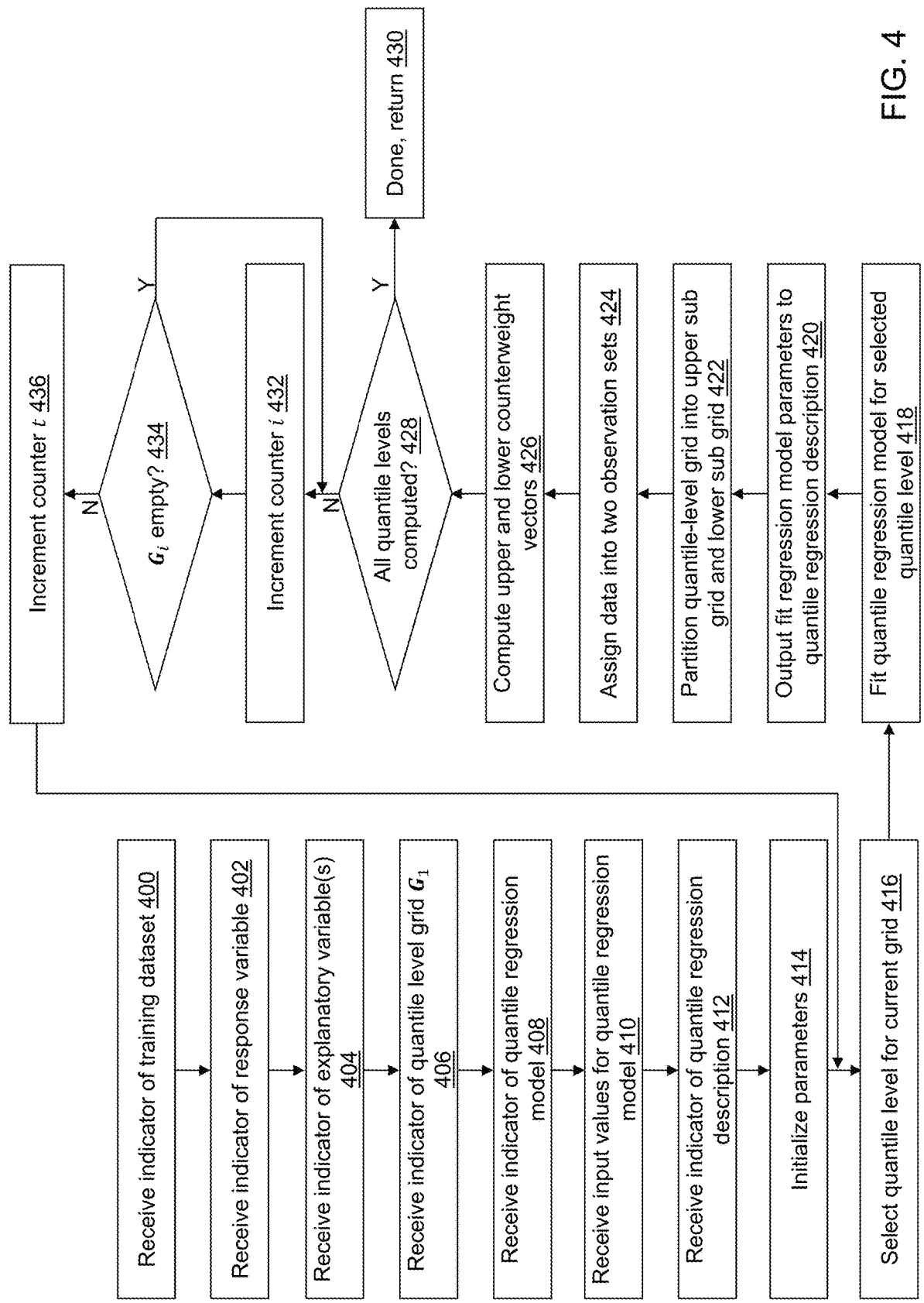
FIG. 4 depicts a flow diagram illustrating examples of operations performed by the quantile regression description device of FIG. 1 in accordance with an illustrative embodiment.

Referring to FIG. 4, example operations associated with fast quantile regression application 122 are described. For example, a user can select "simple binary" to execute FIG. 4 that performs a quantile model fitting progression based on a binary tree structure. Fast quantile regression application 122 may be used to create quantile regression description 126 from training dataset 124. Additional, fewer, or different operations may be performed depending on the embodiment of fast quantile regression application 122. The order of presentation of the operations of FIG. 4 is not intended to be limiting. Some of the operations may not be performed in some embodiments. Although some of the operational flows are presented in sequence, the various operations may be performed in various repetitions, concurrently (in parallel, for example, using threads and/or a distributed computing system), and/or in other orders than those that are illustrated. For example, a user may execute fast quantile regression application 122, which causes presentation of a first user interface window, which may include a plurality of menus and selectors such as drop down menus, buttons, text boxes, hyperlinks, etc. associated with fast quantile regression application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by fast quantile regression application 122.

Referring to FIG. 4, in an operation 400, a first indicator may be received that indicates training dataset 124. For example, the first indicator indicates a location and a name of training dataset 124. As an example, the first indicator may be received by fast quantile regression application 122 after selection from a user interface window or after entry by a user into a user interface window. In an alternative embodiment, training dataset 124 may not be selectable. For example, a most recently created dataset may be used automatically. $D_1=\{1, \ldots, n\}$ represents the indices of all observation vectors stored in training dataset 124

In an operation 402, a second indicator may be received that indicates response variable Y in training dataset 124. For example, the second indicator may indicate a column number or a column name. As another option, a first or a last column of training dataset 124 may be assumed to be the response variable Y column.

In an operation 404, a third indicator may be received that indicates explanatory variable vector x in training dataset 124. For example, the third indicator may indicate a plurality of column numbers or a plurality of column names. As another option, all columns except a first or a last column of training dataset 124 may be assumed to be explanatory variable vector x.

In an operation 406, a fourth indicator may be received that indicates a quantile level grid $G_1$. The quantile level grid can also be indirectly indicated by a resolution value for resolution parameter b. If a resolution value b>1 is received, this operation 406 internally translates b into an equally spaced quantile-level grid $$G_1 = \left\{\frac{1}{2^b}, \frac{2}{2^b}, \ldots, \frac{2^b-1}{2^b}\right\}.$$

For example, as shown in FIG. 3A, b=5 is translated into the quantile level grid: $G_1=\{1/32, 2/32=1/16, \ldots, 31/32\}$ because $2^b=2^5=32$, where each node, such as first node 302 or second node 304, corresponds to a quantile level in $G_1$. As another example, as shown in FIG. 3B, the grid $G_1=\{0.45, 0.5, 0.55, 0.6, 0.65, 0.7, 0.75, 0.8, 0.85, 0.9, 0.95\}$ is directly indicated. In an alternative embodiment, the fourth indicator may not be received. For example, a default value(s) may be stored, for example, in computer-readable medium 108 and used automatically. The quantile level grid may include a plurality of $\tau$ values, where a number of the plurality of $\tau$ values is q, which is greater than or equal to two. FQPR solves a QPR problem by recursively splitting training dataset 124 into smaller groups as described by operations 416 to 436.

In an operation 408, a fifth indicator of a single-level quantile regression solver may be received. For example, the fifth indicator indicates a name of a quantile regression solver. The fifth indicator may be received by fast quantile regression application 122 after selection from a user interface window or after entry by a user into a user interface window. A default value for the quantile regression solver may further be stored, for example, in computer-readable medium 108. As an example, a quantile regression solver may be selected from "Simplex", "Interior-Point", "Smoothing", "Randomized", "Majorization-Minimization", etc. For example, a default quantile regression solver may be indicated by "Interior-Point". Of course, the quantile regression solver may be labeled or selected in a variety of different manners by the user as understood by a person of skill in the art. In an alternative embodiment, the quantile regression solver may not be selectable, and a single quantile regression solver is implemented by fast quantile regression application 122. For example, the quantile regression solver indicated as "Interior-Point" may be used by default or without allowing a selection.

In an operation 410, a sixth indicator of input values for input parameters to use with the indicated quantile regression solver may be received. For example, a weight associated with each component of explanatory variable vector x may be input for use by the quantile regression solver. As another example, a model selection method, such as "Forward", "Backward", "Stepwise", etc., may be specified for the quantile regression solver. As yet another example, a polynomial degree may be specified for the quantile regression solver. Additional examples include a "Class" input parameter that defines categorical variables in explanatory variable vector x, an "Effect" input parameter used to generate a polynomial, a spline, or a multi-member expansion in explanatory variable vector x, and a validation factor that defines a percentage of training dataset 124 to extract for use as a validation dataset, as needed. In an alternative embodiment, the sixth indicator may not be received. For example, default values for the input parameters may be stored, for example, in computer-readable medium 108 and used automatically.

In an operation 412, a seventh indicator may be received that indicates quantile regression description 126. For example, the seventh indicator indicates a location and a name of quantile regression description 126 as well as an output used to define each quantile level function. For example, the output may be selected as "Parameter Estimates for Quantile Process", "Objective Values for Quantile Process", "Average Standardized", "Parameter Estimate", "Average Parameter Estimate", "Information for Quantile-Level Grid", etc. As an example, the seventh indicator may be received by fast quantile regression application 122 after selection from a user interface window or after entry by a user into a user interface window. In an alternative embodiment, quantile regression description 126 and/or the output may not be selectable. For example, default values may be stored, for example, in computer-readable medium 108 and used automatically.

In an operation 414, parameters are initialized. For example, data range parameters are initialized as ($\tau_1^L=0$, $\tau_1^U=1$). The lower and upper counterweight vectors are initialized as ($y_1^L$, $x_1^L$)=($y_1^U$, $x_1^U$)=(0, 0). As another example, two counters, i and t are initialized to one as i=t=1. First counter i traces a computing progression. Second counter t traces a number of quantile levels that have been processed.

In an operation 416, a quantile level $\tau_i^*$ is selected in the grid $G_i$ that is closest to $$\frac{\tau_i^L + \tau_i^U}{2}$$

among all the quantile levels in $G_i$. For example, as shown in FIG. 3A, the selected quantile level for $G_1$ is $$\frac{\tau_1^L + \tau_1^U}{2} = \frac{0+1}{2} = 0.5$$

as shown in third node 306; the selected quantile level for $$G_5 = \left\{\frac{9}{32}, \frac{10}{32} = \frac{5}{16}, \ldots, \frac{15}{32}\right\} \text{ is } \frac{\tau_5^L + \tau_5^U}{2} = \frac{\frac{1}{4} + \frac{1}{2}}{2} = 3/8$$

as shown in first node 302. The selected quantile level may not be exactly equal to $$\frac{\tau_i^L + \tau_i^U}{2}.$$

In an operation 418, a quantile regression solver is fit to the observation vectors indexed in $D_i$ of training dataset 124 plus the lower and the upper counterweight vectors ($y_i^L$, $x_i^L$) and ($y_i^U$, $x_i^U$) using the indicated quantile regression solver. In operation 400, $D_1$ initially contains all of the observation vectors included in training dataset 124. For subsequent iterations, $D_i$ is defined for the sub quantile level grid as discussed further below. For illustration, a QPR procedure or action implemented by SAS/STAT software or SAS Viya software fits a quantile regression solver by solving the primal problem:

$$\text{minimize } ((1-\tau_i^*)x^L - \tau_i^* x^U)\beta + \sum_{j \in D} \rho_{\tau_i^*}(y_j - x_j\beta)$$

$$\text{with } \rho_{\tau_i^*}(y_j - x_j\beta) = \begin{cases} \tau_i^*(y_j - x_j\beta) & \text{for } y_j - x_j\beta \geq 0 \\ (\tau_i^* - 1)(y_j - x_j\beta) & \text{for } y_j - x_j\beta < 0 \end{cases}$$

or, equivalently, solving the dual problem:

$$\text{maximize } \sum_{j \in D_i} a_j y_j$$

$$\text{subject to } \sum_{j \in D_i} a_j x_j = (1-\tau_i^*)\left(x^L + \sum_{j \in D_i} x_j\right) - \tau^* x^U;$$

$$0 \leq a_j \leq 1 \text{ for } j \in D.$$

In an operation 420, the parameter estimate vector $\hat{\beta}(\tau_i^*)$, the dual solution vector $\{\hat{a}_j(\tau_i^*):j \in D_i\}$, and objective values for the fitted quantile-regression model are output, for example, by storing them to quantile regression description 126 in association with quantile level $\tau_i^*$. A Bayesian information criterion value, an Akaike information criterion value, and/or a corrected Akaike information criterion value may also be output. If training dataset 124 was split into training and validation portions, a validated objective value also may be output when the validation dataset is used as input.

In an operation 422, the current quantile-level grid is partitioned into a lower sub grid $G_{2i}$ and an upper sub grid $G_{2i+1}$ by removing the selected quantile level $\tau_i^*$ in operation 416. The data range for $G_{2i}$ is defined using ($\tau_{2i}^L=\tau_i^L$, $\tau_{2i}^U=\tau_i^*$), and for $G_{2i+1}$ is defined using ($\tau_{2i+1}^L=\tau_i^*$, $\tau_{2i+1}^U=\tau_i^U$). For example, for the initial quantile level grid of the balanced binary tree structure, by removing the quantile level 0.5 from the grid, the lower sub grid is $$\tau_2^L = 0 < G_2 = \left\{\frac{1}{2^b}, \ldots, \frac{2^{b-1}-1}{2^b}\right\} < 0.5 = \frac{2^{b-1}}{2^b} = \tau_2^U;$$

and the upper sub grid is $$\tau_3^L = \frac{2^{b-1}}{2^b} = 0.5 < G_3 = \left\{\frac{2^{b-1}+1}{2^b}, \ldots, \frac{2^b-1}{2^b}\right\} < 1 = \tau_3^U.$$

In an operation 424, the data for the current quantile level grid that is indexed in $D_i$ is assigned into two observation sets: $D_{2i}=\{j \in D_i:\hat{a}_j(\tau_i^*)<1\}$ and $D_{2i+1}=\{j \in D_i:\hat{a}_j(\tau_i^*)>0\}$.

In an operation 426, the lower and the upper counterweight vectors for $G_{2i}$ are defined using $$(y_{2i}^L, x_{2i}^L) = (y_i^L, x_i^L)$$

$$(y_{2i}^U, x_{2i}^U) = (y_i^U, x_i^U) + \sum_{\{j:\hat{a}_j(\tau_i^*)=1, j \in D_i\}} (y_j, x_j)$$

and the lower and the upper counterweight vectors for $G_{2i+1}$ are defined using $$(y_{2i+1}^L, x_{2i+1}^L) = (y_i^L, x_i^L) + \sum_{\{j: \hat{a}_j(\tau_t^*)=0, j \in D_i\}} (y_j, x_j)$$

$$(y_{2i+1}^U, x_{2i+1}^U) = (y_i^U, x_i^U).$$

In an operation 428, a determination is made concerning whether all of the quantile levels have been computed. For example, if t=q. When all of the quantile levels have been computed, processing continues in an operation 430. When all of the quantile levels have not been computed, processing continues in an operation 432.

In operation 430, processing by fast quantile regression application 122 is either done or process control returns to a calling function. Fast quantile regression application 122 provides a powerful computational efficiency for fitting quantile process regressions for any quantile level grids. To illustrate the computational efficiency, for training dataset 124 that included 100,000 observation vectors, the following run times (in seconds) were observed to compare CQPR to FQPR implemented by fast quantile regression application 122:

| b | CQPR | FQPR |
|---|------|------|
| 64 | 416 | 79 |
| 128 | 852 | 92 |

For the comparison, fast quantile regression application 122 was implemented using SAS/IML® a statistical programming language developed and provided by SAS Institute Inc. of Cary, N.C., USA. A C-code implementation of FQPR is also available that increased the computational speed to a value that closely agreed with the $b/\log_2 b$ estimate expected above. For the comparison, fast quantile regression application 122 and CQPR used the interior-point method described in Koenker, R. & Ng, P., A Frisch-Newton Algorithm for Sparse Quantile Regression, *Acta Mathematicae Applicatae Sinica*, 21(2), pp. 225-236, 2005.

The computational complexity for the best current single-level quantile regression solver is np $\log_2(n)$. More generally, the computational complexity for many linear programming solvers is $T=O(n^\alpha p^\eta \log_2(n))$ for some $\alpha \geq 1$ and $\eta \geq 1$ according to Portnoy, S. & Koenker, R., The Gaussian Hare and the Laplacian Tortoise: Computability of Squared-Error versus Absolute-Error Estimators, *Statistical Science*, 12(4), pp. 279-300, 1197. Assuming $n \gg 2^b$ and $n \gg p$, the computational complexity for two quantile regression problems with n/2 observation vectors is approximately $O(2^{1-\alpha}T-2^{1-\alpha}n^\alpha p^\eta)$, which is smaller than a computational complexity for a size n problem. Therefore, fast quantile regression application 122 can double quantile level b with the computational cost of fitting one single-level quantile-regression model on the entire dataset.

In a second comparison between CQPR and FQPR, a quantile-level grid of $q=2^9-1=511$ nodes for b=9 and a heteroscedastic dataset for training dataset 124 that contained 100 explanatory variables and 100,000 observation vectors $(y_j, x_j)$ was used. Training dataset 124 was populated using the following functional coefficient model $$y_j = u_j(x_{j1} + \ldots + x_{jp})$$

$$x_{j1}, \ldots, x_{jp}, u_j \sim \text{uniform}(0,1), IID$$

where IID means identically distributed, the true parameter $\beta_l(\tau)=\tau$ for $l=1, \ldots, p$, and the true intercept $\beta_0=0$. A warm-start approach was used that initialized $\beta(\tau)$ with an average of a prior $\beta(\tau_L)$ and $\beta(\tau_U)$, or one of them if the other is unknown, or zeros if both are unknown.

FIG. 5 depicts a table 500 that compares the computation time (in seconds) and displays an average difference between fitting QPR models using FQPR and using CQPR on the simulated training dataset 124. Each row in table 500 doubles a number of quantiles included in a previous row. As expected, the computation times using FQPR are roughly consistent for each resolution level, b, whereas, each computation time using CQPR roughly doubles the computation time for the previous resolution level b. The total computation time using CQPR was more than one hour; whereas, the total computation time using FQPR was about one minute.

For each resolution level, b, the average difference was defined as a norm of estimated differences from the FQPR method relative to the CQPR method divided by a square root of a number of variables. There are $q=2^{b-1}$ quantile models at quantile level b. Let $\hat{\beta}_{fv}$ and $\hat{\beta}_{cv}$ respectively denote the FQPR and CQPR estimates at quantile $v/2^b$, where $v=1, 2, \ldots, q$. Let p be the number of elements in $\hat{\beta}_{fv}$ and $\hat{\beta}_{cv}$. An average difference may be computed for quantile level b using $$\sqrt{\frac{\sum_{v=1,3,\ldots,2} b_{-1}(\hat{\beta}_{fv} - \hat{\beta}_{cv})'(\hat{\beta}_{fv} - \hat{\beta}_{cv})}{qp}}.$$

An intercept was ignored when computing the average difference. For small quantile levels, such as b<6, because qp≪n, the differences are primarily due to a computer numerical precision and are very small. For larger quantile levels, such as b≥6, because qp≈n, the differences are mainly due to crossing between quantile functions and may be relatively large.

Figure 6:
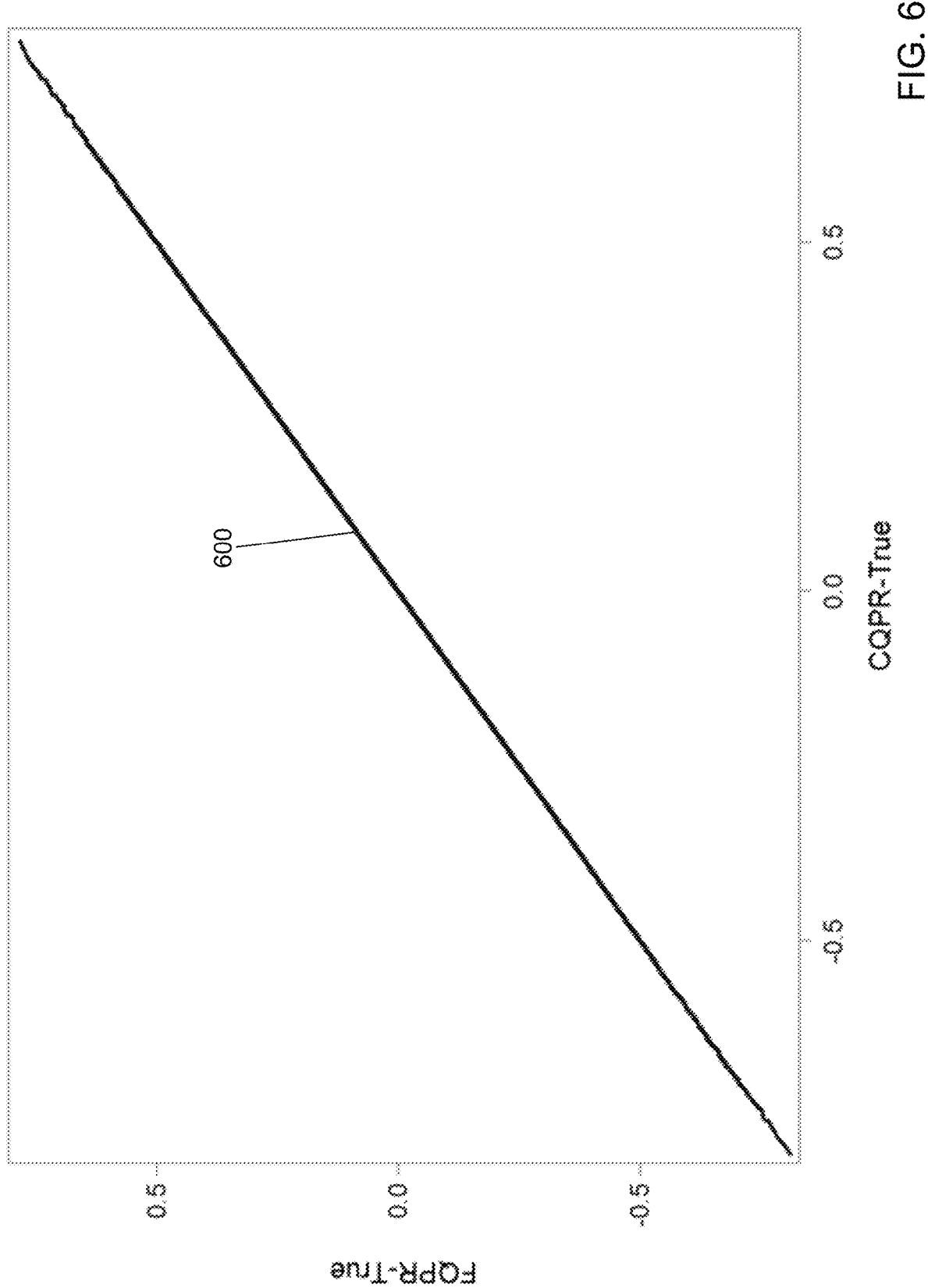
FIG. 6 shows a coefficient comparison between the prior method and the method performed by the quantile regression description device of FIG. 1 for the nine different resolution levels in accordance with an illustrative embodiment.
Figure 7:
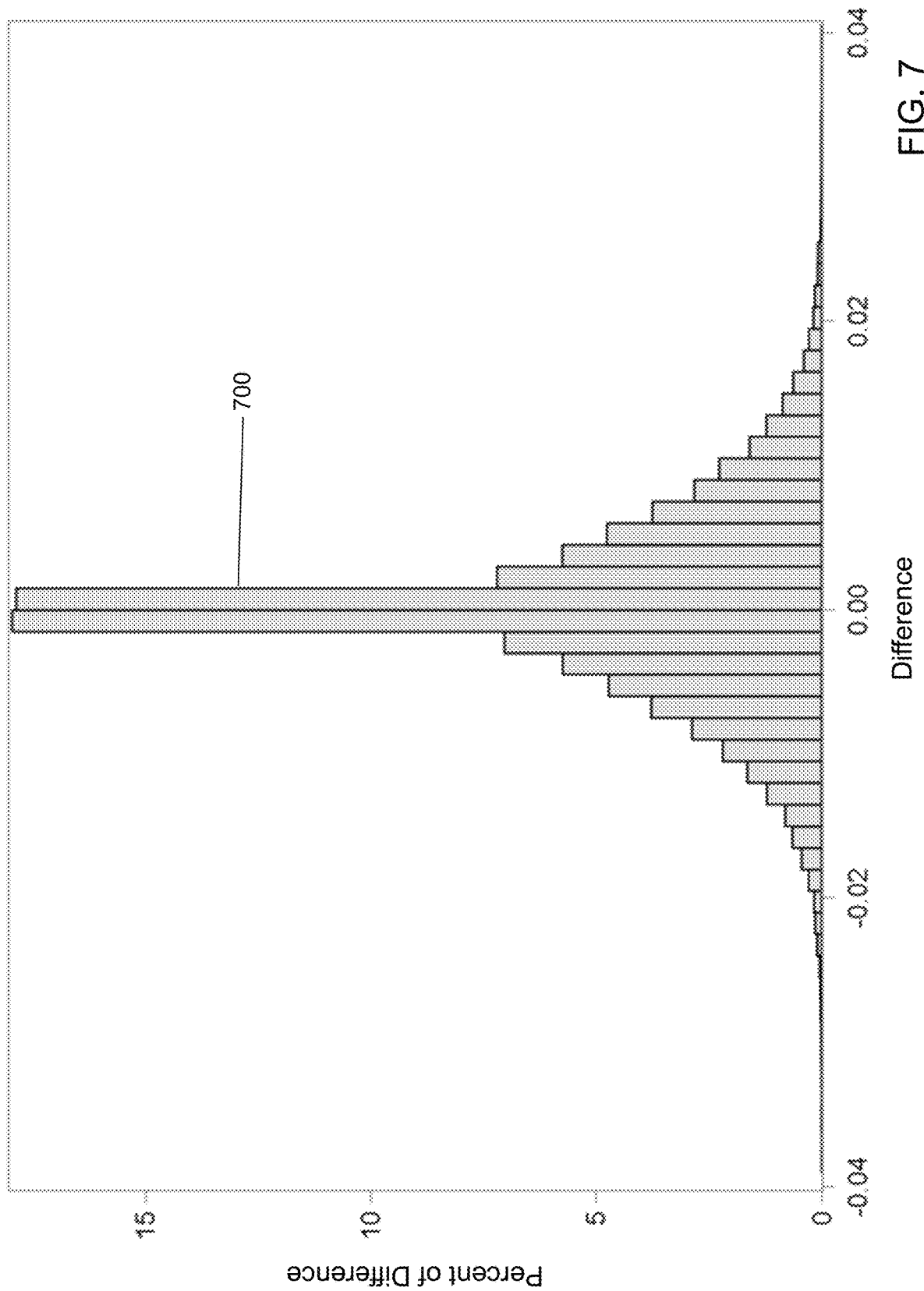
FIG. 7 shows a distribution of the differences in the coefficients between the prior method and the method performed by the quantile regression description device of FIG. 1 for the nine different resolution levels in accordance with an illustrative embodiment.

Referring to FIG. 6, a difference curve 600 shows that FQPR and CQPR are nearly identical relative to an absolute scale of the coefficients being estimated. Referring to FIG. 7, a difference histogram 700 shows that a distribution of the differences is tightly centered around zero. FQPR pays almost no price in estimation accuracy for its clearly vastly improves computational speed and efficiency.

In operation 432, the first counter i is incremented using i=i+1.

In an operation 434, a determination is made concerning whether $G_i$ is empty and contains at least one quantile level. When $G_i$ is empty, processing continues in an operation 432. When $G_i$ is not empty, processing continues in operation 436 to increment to the next sub grid.

In an operation 436, the second counter t is incremented using t=t+1, and processing continues in operation 416 to process the next sub grid.

Figure 8:
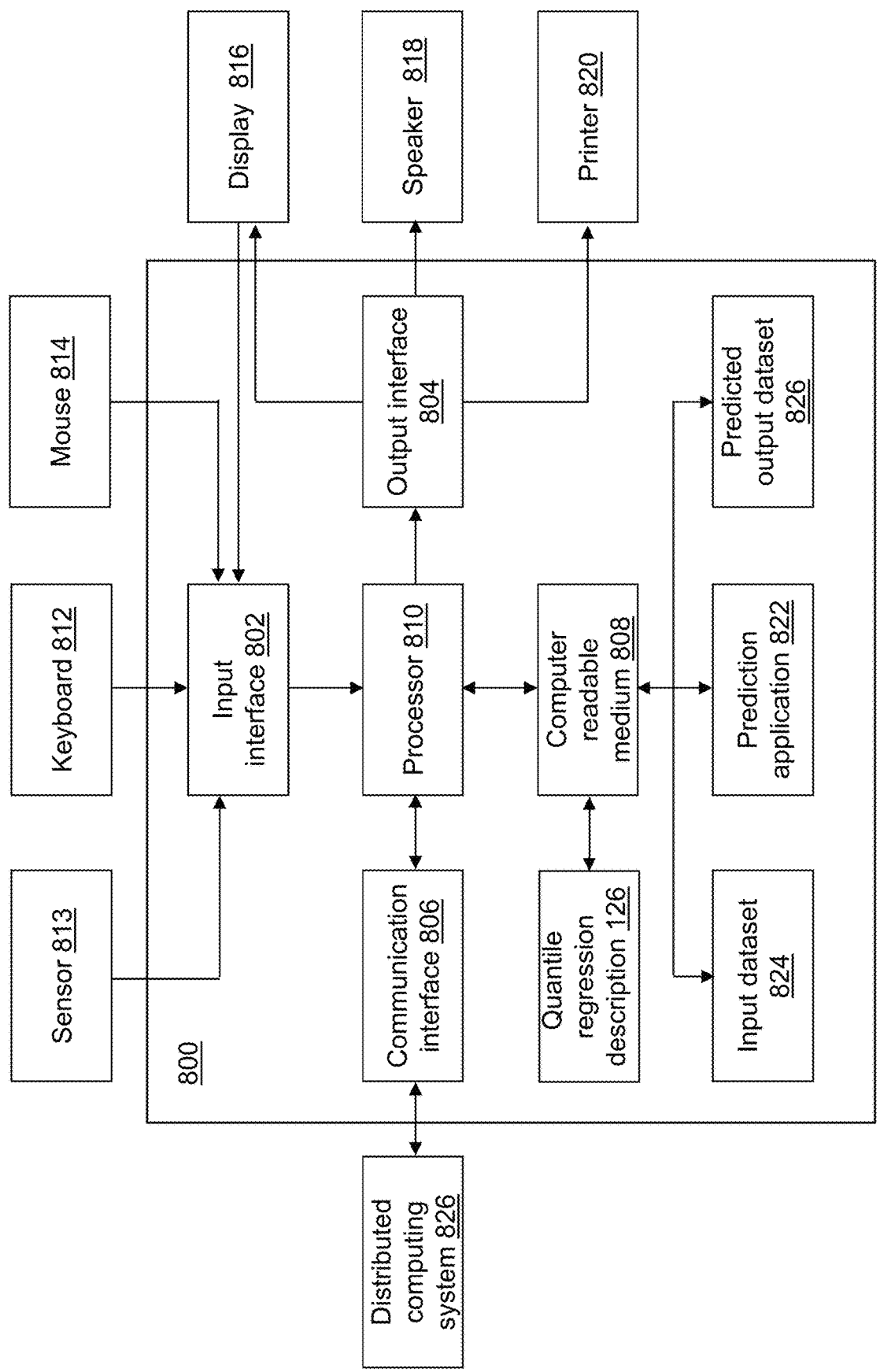
FIG. 8 depicts a block diagram of a prediction device in accordance with an illustrative embodiment.

Referring to FIG. 8, a block diagram of a prediction device 800 is shown in accordance with an illustrative embodiment. Prediction device 800 may include a second input interface 802, a second output interface 804, a second communication interface 806, a second non-transitory computer-readable medium 808, a second processor 810, an prediction application 822, quantile regression description 126, a input dataset 824, and predicted output dataset 826. Fewer, different, and/or additional components may be incorporated into prediction device 800. Prediction device

800 and quantile regression description device 100 may be the same or different devices.

Second input interface 802 provides the same or similar functionality as that described with reference to input interface 102 of quantile regression description device 100 though referring to prediction device 800. Second output interface 804 provides the same or similar functionality as that described with reference to output interface 104 of quantile regression description device 100 though referring to prediction device 800. Second communication interface 806 provides the same or similar functionality as that described with reference to communication interface 106 of quantile regression description device 100 though referring to prediction device 800. Data and messages may be transferred between prediction device 800 and distributed computing system 828 using second communication interface 806. Second computer-readable medium 808 provides the same or similar functionality as that described with reference to computer-readable medium 108 of quantile regression description device 100 though referring to prediction device 800. Second processor 810 provides the same or similar functionality as that described with reference to processor 110 of quantile regression description device 100 though referring to prediction device 800.

Prediction application 822 performs operations associated with predicting quantiles for response variable Y using quantile regression description 126 based on values for explanatory variable vector x stored in input dataset 824. Dependent on the type of data stored in training dataset 124 and input dataset 824, prediction application 822 may identify anomalies as part of process control, for example, of a manufacturing process, for machine condition monitoring, for example, an electro-cardiogram device, etc. Some or all of the operations described herein may be embodied in prediction application 822. The operations may be implemented using hardware, firmware, software, or any combination of these methods.

Figure 9:
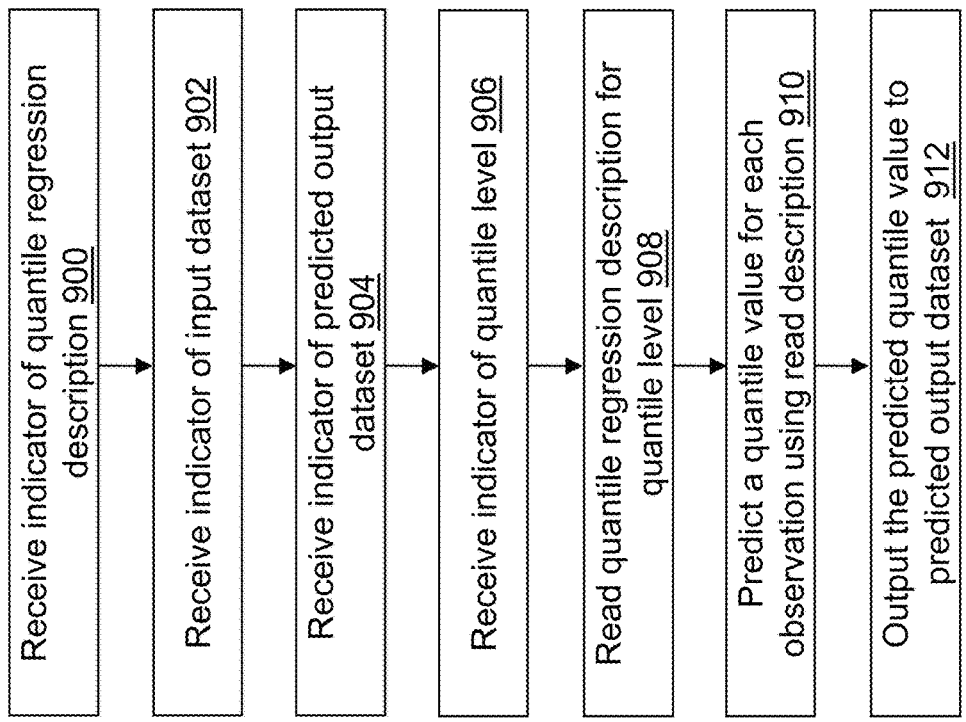
FIG. 9 depicts a flow diagram illustrating examples of operations performed by the prediction device of FIG. 8 in accordance with an illustrative embodiment.

Referring to the example embodiment of FIG. 9, prediction application 822 is implemented in software (comprised of computer-readable and/or computer-executable instructions) stored in second computer-readable medium 808 and accessible by second processor 810 for execution of the instructions that embody the operations of prediction application 822. Prediction application 822 may be written using one or more programming languages, assembly languages, scripting languages, etc. Prediction application 822 may be integrated with other analytic tools. For example, prediction application 822 may be implemented using or integrated with one or more SAS software tools such as Base SAS, SAS/STAT®, of SAS® Enterprise Miner™ SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of prediction application 822 further may be performed by an ESPE. Prediction application 822 and fast quantile regression application 122 further may be integrated applications.

Prediction application 822 may be implemented as a Web application. Prediction application 822 may be integrated with other system processing tools to automatically process data generated as part of operation of an enterprise using second input interface 802, second output interface 804, and/or second communication interface 806 so that appropriate action can be initiated in response. For example, a warning or an alert may be presented using a second display 816, a second speaker 818, a second printer 820, etc. or sent to one or more computer-readable media, display, speaker, printer, etc. of distributed computing system 828 based on the data processing status in FIG. 8.

Training dataset 124 and input dataset 824 may be generated, stored, and accessed using the same or different mechanisms. Similar to training dataset 124, input dataset 824 may include a plurality of rows and a plurality of columns with the plurality of rows referred to as observation vectors or records, and the columns referred to as variables that are associated with an observation. Input dataset 824 may be transposed.

Similar to training dataset 124, input dataset 824 may be stored on second computer-readable medium 808 or on one or more computer-readable media of distributed computing system 828 and accessed by prediction device 800 using second communication interface 806. Data stored in input dataset 824 may be a sensor measurement or a data communication value, for example, from a sensor 813, may be generated or captured in response to occurrence of an event or a transaction, generated by a device such as in response to an interaction by a user with the device, for example, from a second keyboard 812 or a second mouse 814, etc. The data stored in input dataset 824 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 824 may be captured at different time points periodically, intermittently, when an event occurs, etc. One or more columns may include a time value. Similar to training dataset 124, data stored in input dataset 824 may be generated as part of the IoT, and some or all data may be pre- or post-processed by an ESPE.

Similar to training dataset 124, input dataset 824 may be stored in various compressed formats such as a coordinate format, a compressed sparse column format, a compressed sparse row format, etc. Input dataset 824 further may be stored using various structures as known to those skilled in the art including a file system, a relational database, a system of tables, a structured query language database, etc. on quantile regression description device 100, on prediction device 800, and/or on distributed computing system 828. Prediction device 800 and/or distributed computing system 828 may coordinate access to input dataset 824 that is distributed across a plurality of computing devices. For example, input dataset 824 may be stored in a cube distributed across a grid of computers as understood by a person of skill in the art. As another example, input dataset 824 may be stored in a multi-node Hadoop® cluster. As another example, input dataset 824 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in input dataset 824.

Referring to FIG. 9, example operations of prediction application 822 are described. Additional, fewer, or different operations may be performed depending on the embodiment of prediction application 822. The order of presentation of the operations of FIG. 9 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 900, an eighth indicator may be received that indicates quantile regression description 126. For example, the eighth indicator indicates a location and a name of quantile regression description 126. As an example, the eighth indicator may be received by prediction application 822 after selection from a user interface window or after entry by a user into a user interface window. In an alternative embodiment, quantile regression description 126 may not be selectable. For example, a most recently created dataset may be used automatically.

In an operation 902, a ninth indicator may be received that indicates input dataset 126. For example, the ninth indicator indicates a location and a name of input dataset 126. As an example, the ninth indicator may be received by prediction application 822 after selection from a user interface window or after entry by a user into a user interface window. In an alternative embodiment, input dataset 126 may not be selectable. For example, a most recently created dataset may be used automatically.

In an operation 904, a tenth indicator may be received that indicates predicted output dataset 826. For example, the tenth indicator indicates a location and a name of predicted output dataset 826. As an example, the tenth indicator may be received by prediction application 822 after selection from a user interface window or after entry by a user into a user interface window. In an alternative embodiment, predicted output dataset 826 may not be selectable. For example, a default name and location for predicted output dataset 826 may be used automatically.

In an operation 906, an eleventh indicator may be received that indicates a quantile value for quantile level $\tau$ to compute for input dataset 824. In an alternative embodiment, the eleventh indicator may not be received. For example, a default value may be stored, for example, in second computer-readable medium 808 and used automatically.

In an operation 908, a quantile regression description associated with the indicated quantile level $\tau$ is read from quantile regression description 126.

In an operation 910, a quantile value $x_j\hat{\beta}(\tau)$ for a response variable is predicted using the read quantile regression description and values for each explanatory variable vector $x_j$ stored in input dataset 824.

In an operation 912, the predicted quantile value $x_j\hat{\beta}(\tau)$ is output to predicted output dataset 826. Values of the explanatory variable vector $x_j$ associated with each $y_j$ predicted value further may be output to predicted output dataset 826.

Figure 10:
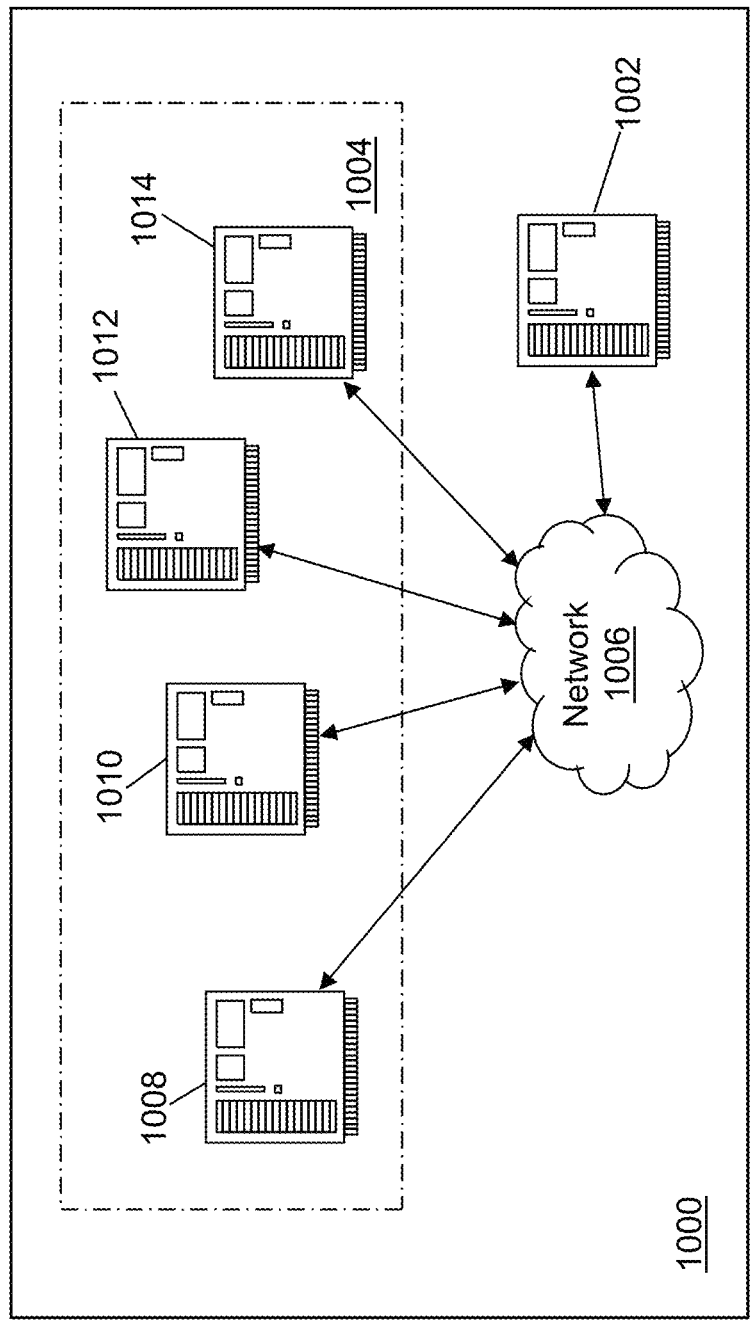
FIG. 10 depicts a block diagram of a quantile regression description system in accordance with an illustrative embodiment.

Referring to FIG. 10, a block diagram of a distributed FQPR system 1000 is shown in accordance with an illustrative embodiment. In an illustrative embodiment, distributed FQPR system 1000 may include distributed control device 1002, distributed computing nodes 1004, and a network 1006. Distributed control device 1002 and/or distributed computing nodes 1004 store a distributed training dataset. One or more components of distributed FQPR system 1000 may support multithreading, as understood by a person of skill in the art.

The components of distributed FQPR system 1000 may be located in a single room or adjacent rooms, in a single facility, and/or may be distributed geographically from one another. Each of distributed control device 1002 and distributed computing nodes 1004 may be composed of one or more discrete devices.

Network 1006 may include one or more networks of the same or different types. Network 1006 can be any type of wired and/or wireless public or private network including a cellular network, a local area network, a wide area network such as the Internet, etc. Network 1006 further may comprise sub-networks and include any number of devices.

For illustration, FIG. 10 represents distributed computing nodes 1004 with a first server computer 1008, a second server computer 1010, a third server computer 10124, and a fourth server computer 1014. Distributed computing nodes 1004 can include any number and form factor of computing devices that may be organized into subnets. The computing devices of distributed computing nodes 1004 send and receive communications through network 1006 to/from another of the one or more computing devices of distributed computing nodes 1004 and/or to/from distributed control device 1002. The one or more computing devices of distributed computing nodes 1004 may communicate using various transmission media that may be wired and/or wireless as understood by those skilled in the art.

In the illustrative embodiment, distributed control device 1002 is represented as a server computing device though distributed control device 1002 may include a computing device of any form factor. Distributed control device 1002 sends and receives communications through network 1006 to/from distributed computing nodes 1004. Distributed control device 1002 may communicate using various transmission media that may be wired and/or wireless as understood by those skilled in the art.

Distributed FQPR system 1000 may be implemented as a grid of computers with each computing device of distributed computing system 826 storing a portion of the distributed training dataset as understood by a person of skill in the art. Distributed FQPR system 1000 may be implemented as a multi-node Hadoop® cluster. Distributed FQPR system 1000 may use cloud computing technologies, which support on-demand network access to a shared pool of configurable computing resources (e.g., networks, servers, storage, applications and services) that can be rapidly provisioned and released with minimal management effort or service provider interaction. Distributed FQPR system 1000 may use SAS® High Performance Analytics server. Distributed FQPR system 1000 may use the SAS LASR™ Analytic Server to deliver statistical modeling and machine learning capabilities in a highly interactive programming environment, which may enable multiple users to concurrently manage data, transform variables, perform exploratory analysis, and build and compare models. Distributed FQPR system 1000 may use SAS In-Memory Statistics for Hadoop® to read big data once and analyze it several times by persisting it in-memory. Some systems may be of other types and configurations.

Figure 11:
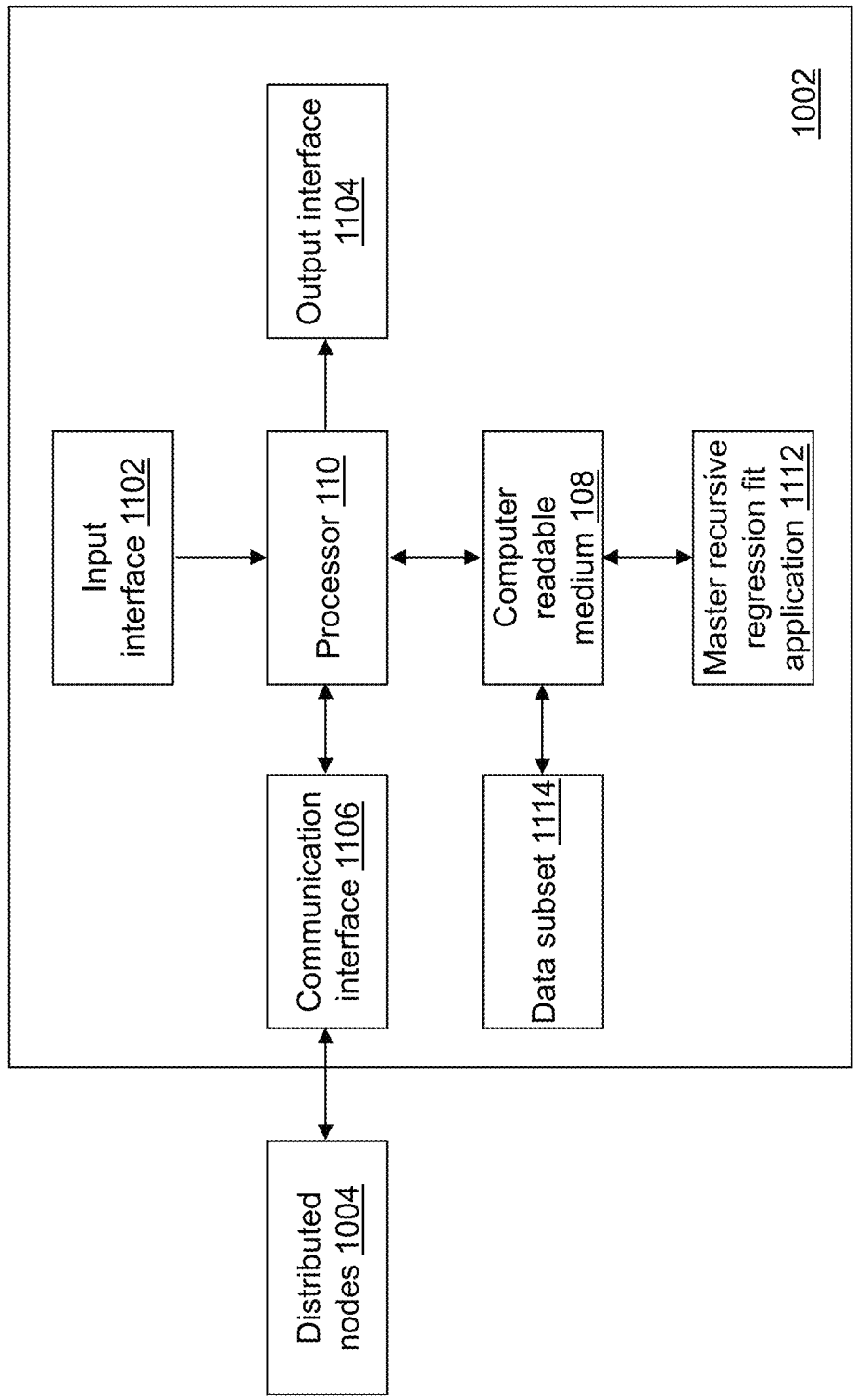
FIG. 11 depicts a block diagram of a control device of the quantile regression description system of FIG. 10 in accordance with an illustrative embodiment.

Referring to FIG. 11, a block diagram of distributed control device 1002 is shown in accordance with an example embodiment. Distributed control device 1002 may include a third input interface 1102, a third output interface 1104, a third communication interface 1106, a third non-transitory computer-readable medium 1108, a third processor 1110, a master recursive regression application 1112, and data subset 1114. Fewer, different, and additional components may be incorporated into distributed control device 1002.

Third input interface 1102 provides the same or similar functionality as that described with reference to input interface 102 of quantile regression description device 100 though referring to distributed control device 1002. Third output interface 1104 provides the same or similar functionality as that described with reference to output interface 104 of quantile regression description device 100 though referring to distributed control device 1002. Third communication interface 1106 provides the same or similar functionality as that described with reference to communication interface 106 of quantile regression description device 100 though referring to distributed control device 1002. Data and messages may be transferred between distributed control device 1002 and distributed computing nodes 1004 using third communication interface 1106. Third computer-readable medium 1108 provides the same or similar functionality as that described with reference to computer-readable medium 108 of quantile regression description device 100 though referring to distributed control device 1002. Third processor 1110 provides the same or similar functionality as that described with reference to processor 110 of quantile regression description device 100 though referring to distributed control device 1002. Master recursive regression application 1112 performs operations associated with requesting a recursive computation of quantiles in quantile level grid $G_1$ using the distributed computing nodes 1004.

Master recursive regression application 1112 performs operations associated with defining quantile regression description 126 from data stored in training dataset 124 that is distributed across distributed control device 1002 and/or the distributed computing nodes 1004. Some or all of the operations described herein may be embodied in master recursive regression application 1112. The operations may be implemented using hardware, firmware, software, or any combination of these methods. Referring to the example embodiment of FIG. 11, master recursive regression application 1112 is implemented in software (comprised of computer-readable and/or computer-executable instructions) stored in third computer-readable medium 1108 and accessible by third processor 1110 for execution of the instructions that embody the operations of master recursive regression application 1112. Master recursive regression application 1112 may be written using one or more programming languages, assembly languages, scripting languages, etc. Master recursive regression application 1112 may be implemented as a Web application.

Data subset 1114 may include data used by master recursive regression application 1112 in support of performing FQPR on the distributed dataset as well as a portion of the distributed dataset.

Figure 12:
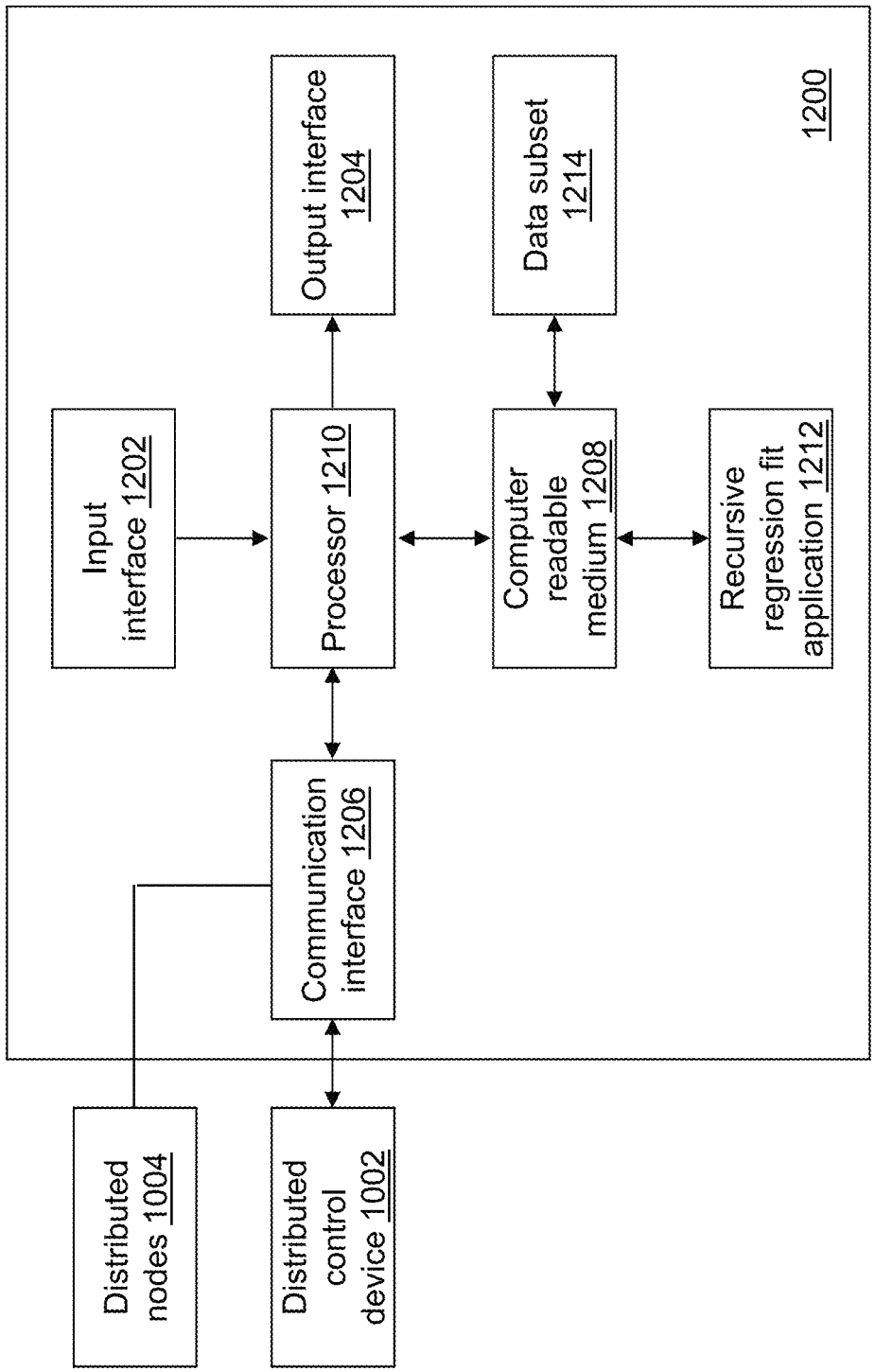
FIG. 12 depicts a block diagram of a node device of the quantile regression description system of FIG. 10 in accordance with an illustrative embodiment.

Referring to FIG. 12, a block diagram of a data node device 1200 is shown in accordance with an illustrative embodiment. Data node device 1200 is an example computing device of distributed computing nodes 1004. Data node device 1200 may include a fourth input interface 1202, a fourth output interface 1204, a fourth communication interface 1206, a fourth non-transitory computer-readable medium 1208, a fourth processor 1210, a recursive regression application 1212, and a data subset 1214. Fewer, different, and additional components may be incorporated into data node device 1200.

Fourth input interface 1202 provides the same or similar functionality as that described with reference to input interface 102 of quantile regression description device 100 though referring to data node device 1200. Fourth output interface 1204 provides the same or similar functionality as that described with reference to output interface 104 of quantile regression description device 100 though referring to data node device 1200. Fourth communication interface 1206 provides the same or similar functionality as that described with reference to communication interface 106 of quantile regression description device 100 though referring to data node device 1200. Data and messages may be transferred between data node device 1200 and distributed control device 1002 and between data node device 1200 and another computing node of the distributed computing nodes 1004 using fourth communication interface 1206. Fourth computer-readable medium 1208 provides the same or similar functionality as that described with reference to computer-readable medium 108 of quantile regression description device 100 though referring to data node device 1200. Fourth processor 1210 provides the same or similar functionality as that described with reference to processor 110 of quantile regression description device 100 though referring to data node device 1200.

Recursive regression application 1212 performs operations associated with recursively defining quantile regression description 126 after an initial call from master recursive regression application 1112. Some or all of the operations described herein may be embodied in recursive regression application 1212. The operations may be implemented using hardware, firmware, software, or any combination of these methods. Referring to the example embodiment of FIG. 12, recursive regression application 1212 is implemented in software (comprised of computer-readable and/or computer-executable instructions) stored in fourth computer-readable medium 1208 and accessible by fourth processor 1210 for execution of the instructions that embody the operations of recursive regression application 1212. Recursive regression application 1212 may be written using one or more programming languages, assembly languages, scripting languages, etc. Recursive regression application 1212 may be implemented as a Web application.

Data subset 1214 stores a portion of the data distributed across distributed computing nodes 1004 with each computing device of the distributed computing nodes 1004 storing a different portion of the data.

Due to the self-similarity property of tree 300, each FQPR subtree can share the same computing paradigm on data subset 1214 with local initial $x^L$ and $x^U$ bounds. Therefore, its computation can be recursively assigned to different nodes of distributed computing nodes 1004 for efficient processing as described in the following algorithm.

Figure 13:
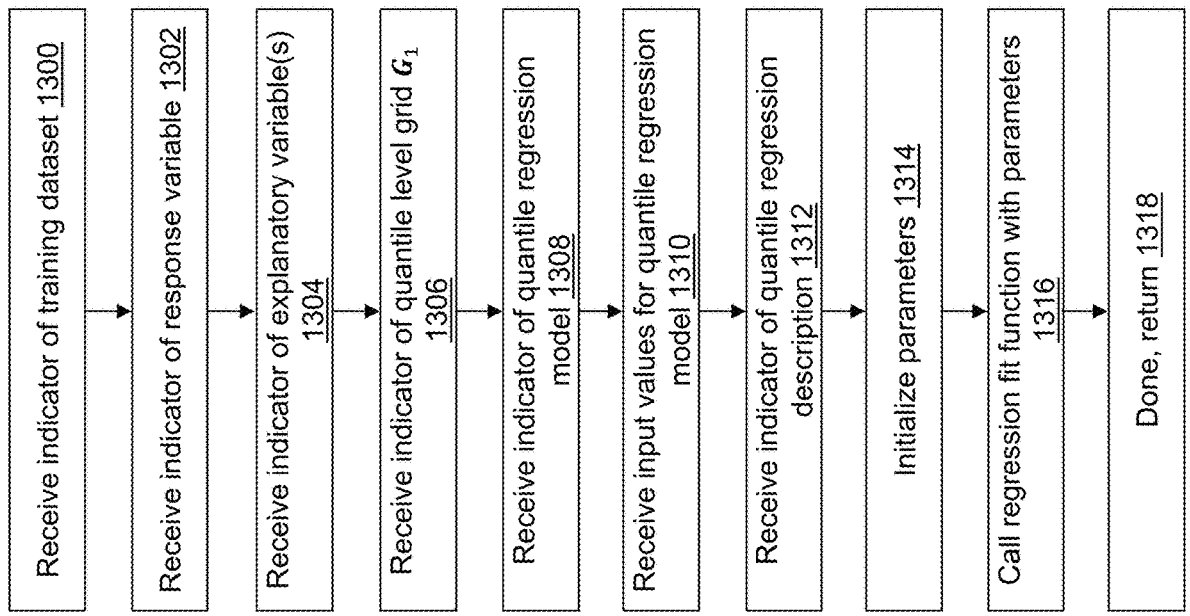
FIG. 13 depicts a flow diagram illustrating examples of operations performed by the control device of FIG. 11 in accordance with an illustrative embodiment.

Referring to FIG. 13, example operations associated with master recursive regression application 1112 are described. Additional, fewer, or different operations may be performed depending on the embodiment of master recursive regression application 1112. Master recursive regression application 1112 performs operations similar to those described in FIG. 4 performed by fast quantile regression application 122 though the operations are distributed across distributed control device 1002 and the distributed computing nodes 1004. The order of presentation of the operations of FIG. 13 is not intended to be limiting. Some of the operations may not be performed in some embodiments. Although some of the operational flows are presented in sequence, the various operations may be performed in various repetitions, concurrently (in parallel, for example, using threads and/or a distributed computing system), and/or in other orders than those that are illustrated.

Referring to FIG. 13, similar to operation 400, in an operation 1300, a first indicator may be received that indicates training dataset 124.

Similar to operation 402, in an operation 1302, a second indicator may be received that indicates response variable Y in training dataset 124.

Similar to operation 404, in an operation 1304, a third indicator may be received that indicates explanatory variable vector x in training dataset 124.

Similar to operation 406, in an operation 1306, a fourth indicator may be received that indicates a quantile level grid $G_1$.

Similar to operation 408, in an operation 1308, a fifth indicator of a single-level quantile regression solver may be received.

Similar to operation 410, in an operation 1310, a sixth indicator of input values for input parameters to use with the indicated quantile regression solver may be received.

Similar to operation 412, in an operation 1312, a seventh indicator may be received that indicates quantile regression description 126.

Similar to operation 414, in an operation 1314, parameters are initialized. For example, data range parameters are initialized as ($\tau^L=0, \tau^U=1$). The lower and the upper counterweight vectors are initialized as ($y^L, x^L$)=($y^U, x^U$)=(0,0). The data and data indices are initialized based using the entire training dataset 124 distributed across distributed control device 1002 and each data node device 1200 of the distributed computing nodes 1004 as $\{(y_j, x_j): j \in D\}$, D={1, 2, ..., n}, where n is a number of observation vectors in training dataset 124. The quantile level grid is initialized as $G=\{\tau_1 < \tau_2 < ... < \tau_q\}$. A list of data node device 1200 of the distributed computing nodes 1004 is initialized to include all of the computing nodes as C={$c_1, c_2, ..., c_w$}, where w is a number of data node devices 1200 of the distributed computing nodes 1004.

In an operation 1316, a regression fit is called. For example, the call may have the form FastFit (D, G, C, $\{(y_j, x_j): j \in D\}$, ($y^L, x^L$), ($y^U, x^U$), $\tau^L, \tau^U$). As discussed further below, a recursion tree 1500 (shown referring to FIG. 15) of regression fit executions is distributed across distributed control device 1002 and each data node device 1200 of the distributed computing nodes 1004 and called in succession until a last quantile level of quantile level grid is initialized as G is computed. For a first call from distributed control device 1002, all of the data node devices 1200 of the distributed computing nodes 1004 are used with all of training dataset 124.

Figure 14:
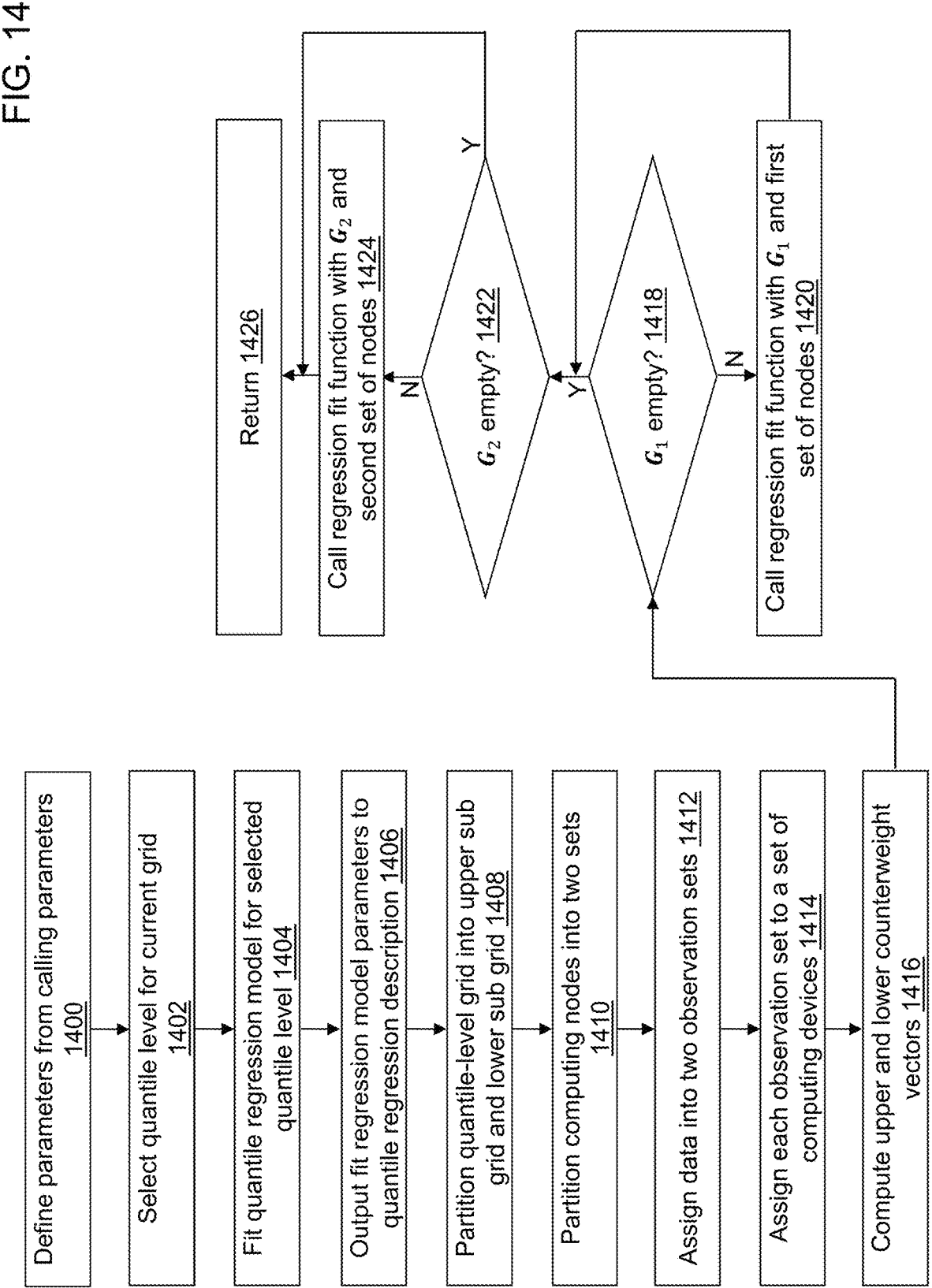
FIG. 14 depicts a flow diagram illustrating examples of operations performed by the control device of FIG. 11 and each node device of FIG. 12 in accordance with an illustrative embodiment.

Referring to FIG. 14, each execution performs the described operations with successive splitting as needed until all of the quantile levels have been assigned and computed. Referring to FIG. 14, example operations associated with master recursive regression application 1112 and with recursive regression application 1212 are described. Additional, fewer, or different operations may be performed depending on the embodiment of master recursive regression application 1112 and recursive regression application 1212. The order of presentation of the operations of FIG. 14 is not intended to be limiting. Some of the operations may not be performed in some embodiments. Although some of the operational flows are presented in sequence, the various operations may be performed in various repetitions, concurrently (in parallel, for example, using threads and/or a distributed computing system), and/or in other orders than those that are illustrated.

Similar to operation 414, in an operation 1400, parameters are initialized based on the parameters passed through the call. For example, the lower and the upper counterweight vectors ($y^L, x^L$), ($y^U, x^U$), $\tau^L$ and $\tau^U$ are initialized; the data and data indices are initialized D; the quantile level grid G is initialized; and the list of data node devices 1200 C of the distributed computing nodes 1004 is defined.

Similar to operation 416, in an operation 1402, a quantile level $\tau^*$ is selected in the grid G that is closest to $$\frac{\tau^L + \tau^U}{2}$$

among am the quantile levels in $\tau^U$.

Similar to operation 418, in an operation 1404, a quantile regression solver is fit to the observation vectors indexed in D of training dataset 124 plus the lower and the upper counterweight vectors ($y^L, x^L$) and ($y^U, x^U$) using the indicated quantile regression solver that also may be passed as a calling parameter. For illustration, a QPR procedure or action implemented by SAS/STAT software or SAS Viya software fits a quantile regression solver by solving the primal problem:

$$\text{minimize } ((1-\tau^*)x^L - \tau x^U)\beta + \sum_{j \in D} \rho_{\tau^*}(y_j - x_j\beta)$$

$$\text{with } \rho_{\tau^*}(y_j - x_j\beta) = \begin{cases} \tau^*(y_j - x_j\beta) & \text{for } y_j - x_j\beta \geq 0 \\ (\tau^* - 1)(y_j - x_j\beta) & \text{for } y_j - x_j\beta < 0 \end{cases}$$

or, equivalently, solving the dual problem:

$$\text{maximize } \sum_{j \in D} a_j y_j$$

$$\text{subject to } \sum_{j \in D} a_j x_j = (1-\tau^*)\left(x^L + \sum_{j \in D} x_j\right) - \tau^* x^U$$

$$0 \leq a_j \leq 1 \text{ for } j \in D.$$

Similar to operation 420, in an operation 1406, the parameter estimates $\hat{\beta}(\tau^*)$, the dual solution $\{\hat{a}_j(\tau^*): j \in D\}$, and objective values for the fitted quantile-regression model are output, for example, by storing them to quantile regression description 126 in association with quantile level $\tau^*$. A Bayesian information criterion value, an Akaike information criterion value, and/or a corrected Akaike information criterion value may also be output. If training dataset 124 was split into training and validation portions, a validated objective value also may be output when the validation dataset is used as input.

Similar to operation 422, in an operation 1408, the current quantile-level grid is partitioned into a lower sub grid $G_1=\{\tau \in G: \tau < \tau^*\}$ and an upper sub grid $G_2=\{\tau \in G: \tau > \tau^*\}$, and $\tau_1^L = \tau^L$, $\tau_1^U = \tau^*$, $\tau_2^L = \tau^*$, and $\tau_1^U = \tau^U$.

In an operation 1410, the list of data node devices 1200 C of the distributed computing nodes 1004 are partitioned into two sets using $$C_1 = \left\{\frac{\tau^* - \tau^L}{\tau^U - \tau^L} \text{ proportion of nodes in } C\right\} \text{ and } C_2 = C - C_1.$$

Similar to operation 424, in an operation 1412, the data for the current quantile level grid that is indexed in D is assigned into two observation sets: $D_1=\{i \in D: \hat{a}_i < 1\}$ and $D_2=\{i \in D: \hat{a}_i > 0\}$, and $(y_1^L, x_1^L)=(y^L, x^L)$, $(y_1^U, x_1^U) = (y^U, x^U) + \Sigma_{\{j \in D: \hat{a}_j = 1\}}(y_j, x_j)(y_2^L, x_2^L) = (y^L, x^L) + \Sigma_{\{j \in D: \hat{a}_j = 0\}}(y_j, x_j)$, and $(y_2^U, x_2^U) = (y^U, x^U)$.

In an operation 1414, the first observation set $D_1$ is assigned to the first list of data node devices 1200 $C_1$, and the second observation set $D_1$ is assigned to the second list of data node devices 1200 $C_2$.

Similar to operation 426, in an operation 1416, the lower and the upper counterweight vectors are defined for $G_1$ using $(y_1^L, x_1^L)=(y^L, x^L)$, $(y_1^U, x_1^U)=(y^U, x^U)+\Sigma_{\{j\in D:\hat{a}_j=1\}}(y_j, x_j)$, and for $G_2$ using $(y_2^L, x_2^L)=(y^L, x^L)+\Sigma_{\{j\in D:\hat{a}_j=0\}}(y_j, x_j)$, and $(y_2^U, x_2^U)=(y^U, x^U)$.

Similar to operation 434, in an operation 1418, a determination is made concerning whether $G_1$ is empty. When $G_1$ is empty, processing continues in an operation 1422. When $G_1$ is not empty, processing continues in an operation 1420.

Similar to operation 1316, in an operation 1420, a regression fit is called and once the call is returned from, processing continues in operation 1422. For example, the call may have the form FastFit($D_1, G_1, C_1, \{(y_j, x_j): j \in D_1\}, (y_1^L, x_1^L), (y_1^U, x_1^U), \tau_1^L, \tau_1^U$).

Similar to operation 434, in operation 1422, a determination is made concerning whether $G_2$ is empty. When $G_2$ is empty, processing continues in an operation 1426. When $G_2$ is not empty, processing continues in an operation 1424.

Similar to operation 1316, in an operation 1424, a regression fit is called and once the call is returned from, processing continues in operation 1422. For example, the call may have the form FastFit($D_2, G_2, C_2, \{(y_j, x_j): j \in D_1\}, (y_2^L, x_2^L), (y_2^U, x_2^U), \tau_2^L, \tau_2^U$).

Once the call is returned from, processing continues in an operation 1426.

In operation 1426, processing associated with the called FastFit function is complete and control returns to the calling function until control returns to master recursive regression application 1112 that initially called the FastFit function in operation 1316.

Referring again to FIG. 13, similar to operation 430, in an operation 1318, processing by fast quantile regression application 122 is either done or process control returns to a calling function.

Figure 15:
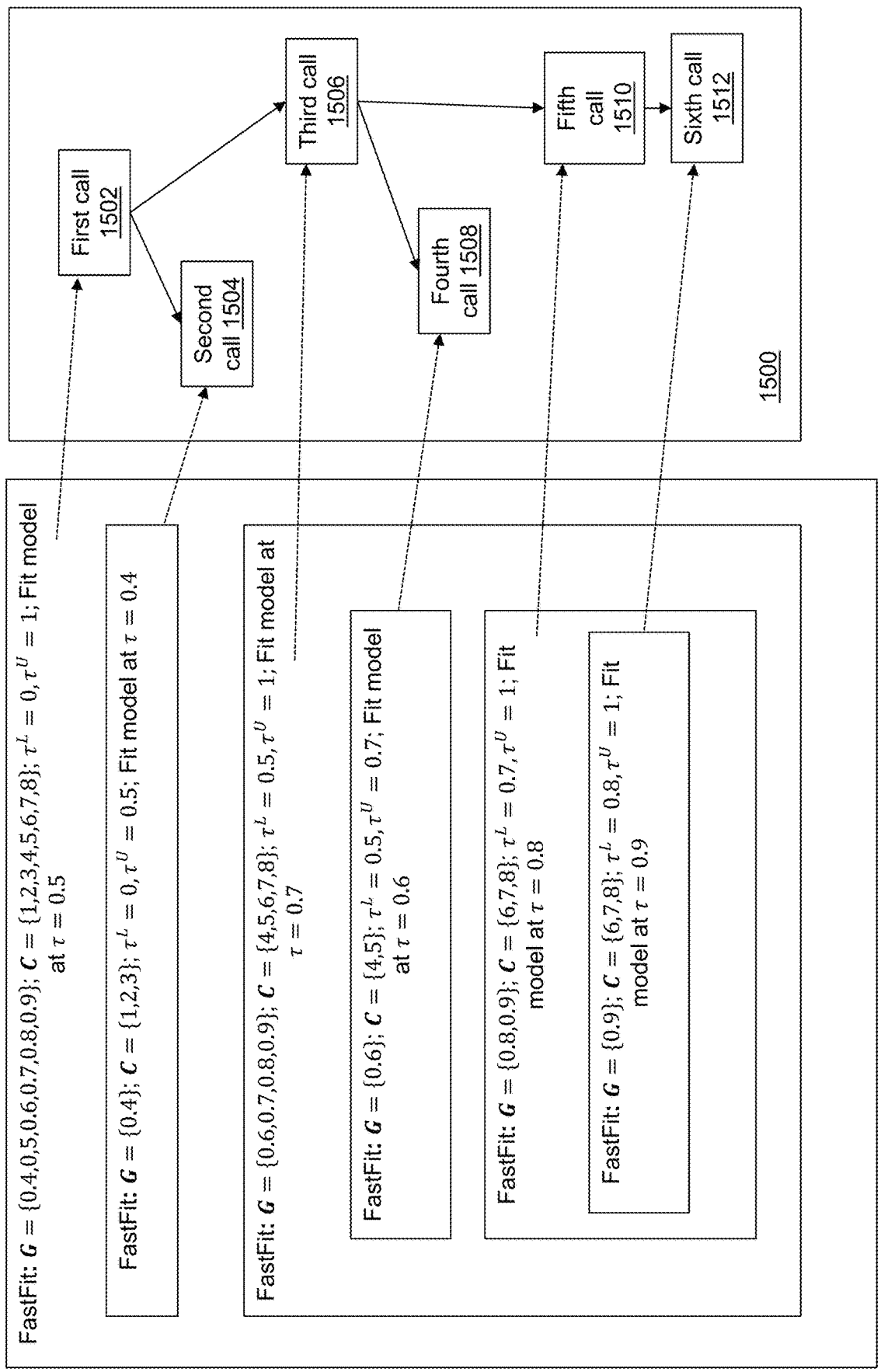
FIG. 15 depicts a recursion tree of calls to compute a predefined quantile level grid in accordance with an illustrative embodiment.

Referring to FIG. 15, recursion tree 1500 is shown with a corresponding call to the FastFit function to illustrate the recursive computation. In the illustrative embodiment, the predefined quantile level grid 312 included 6 quantile levels (excluding $\tau^L$ and $\tau^U$) and is predefined as $\tau^L=0<\tau_1=0.4<\tau_2=0.5<\tau_3=0.7<\tau_4=0.6<\tau_5=0.8<\tau_6=0.9<1=\tau^U$. A first call 1502 to the FastFit function to compute $\tau^*=0.5$ is made with $G=\{0.4, 0.5, 0.6, 0.7, 0.8, 0.9\}$; $C=\{1, 2, 3, 4, 5, 6, 7, 8\}$; $\tau^L=0$, $\tau^U=1$, where w=8 is the number of data node devices 1200 of the distributed computing nodes 1004. First call 1502 results in a second call 1504 to the FastFit function to compute $\tau^*=0.4$ with, $G_1=\{0.4\}$; $C_1=\{1, 2, 3\}$; $\tau_1^L=0$, $\tau_1^U=0.5$, where w=3 in operation 1420. First call 1502 also results in a third call 1506 to the FastFit function to compute $\tau^*=0.7$ with, $G_2=\{0.6, 0.7, 0.8, 0.9\}$; $C_2=\{4, 5, 6, 7, 8\} \tau_2^L=0.5$, $\tau_2^U=1$, where w=5 in operation 1422.

Second call 1504 returns control to first call 1502 once the regression fit to $\tau^*=0.4$ finishes. Third call 1506 results in a fourth call 1508 to the FastFit function to compute $\tau^*=0.6$ with, $G_1=\{0.6\}$; $C_1=\{4, 5\}$; $\tau_1^L=0.5$, $\tau_1^L=0.7$, where w=2 in operation 1420. Third call 1506 also results in a fifth call 1510 to the FastFit function to compute $\tau^*=0.8$ with, $G_2=\{0.8, 0.9\}$; $C_2=\{6, 7, 8\}$; $\tau_2^L=0.7$, $\tau_2^U=1$, where w=3 in operation 1422.

Fourth call 1508 returns control to third call 1506 once the regression fit to $\tau^*=0.6$ finishes. Fifth call 1510 results in a sixth call 1512 to the FastFit function to compute $\tau^*=0.9$ with, $G_1=\{0.9\}$; $C_1=\{4, 5\}$; $\tau_1^L=0.5$, $\tau_1^L=0.7$, where w=2 in operation 1420. Sixth call 1512 returns control to fifth call 1510 once the regression fit to $\tau^*=0.9$ finishes. Fifth call 1510 returns control to third call 1506 once the regression fits to $\tau^*=0.8$ and $\tau^*=0.9$ finish. Third call 1506 returns control to first call 1502 once the regression fits to $\tau^*=0.6$, 0.7, 0.8, 0.9 finish.

FQPR improves the computational efficiency for quantile process regression applications. Current QPR algorithms are linearly dependent on the number of quantile levels q of the quantile process; whereas, FQPR is dependent on $\log_2 q$. For example, q=1024 has $\log_2 q=10$, so that FQPR is more than 100 times faster than current QPR algorithms. In addition, FQPR can be implemented in distributed computing environments. As a result, FQPR can utilize modern cloud server systems for massive data process.

FQPR generalizes sorting technology, such as quick sort, to regression area. Instead of sorting a data array by directly comparing the numbers in the array, QPR compares numbers with adjustment on their explanatory variable vector values. For example, five-foot is about the 96 percentile for the height of a ten-years-old boy, and six-foot is 92 percentile for the height of an adult. Then, in the QPR terminology, the boy is taller than the adult with adjustment on their ages, because 96 is larger than 92. In this sense, FQPR empowers fair comparison for many real applications.

In terms of industrial applications, QPR is a flexible methodology for estimating probability distribution of a dependent variable conditional on a set of explanatory variables. Unlike parametric distribution, assumption based statistical modelling methods, QPR is distribution-agnostic which does not assume a prior parametric distribution for the dependent variable, so QPR is especially useful for heterogeneous data regression analysis. QPR is also useful for analyzing censored data, counterfactual statements, count and rank data, rare events, and so on. In this sense, FQPR enhances the QPR statistical application by saving computation costs or by processing more data within limited time periods.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

read a dataset that includes a plurality of observation vectors, wherein each observation vector includes a response variable value and an explanatory vector of a plurality of explanatory variable values;
identify a plurality of quantile level values;
recursively perform,
    dividing the read dataset into subsets of the plurality of observation vectors;
    computing a lower counterweight vector and an upper counterweight vector for each of the subsets; and
    fitting a quantile regression solver to each of the subsets using the computed lower counterweight vector associated with each subset of the subsets and the computed upper counterweight vector associated with each subset of the subsets to describe a quantile function for the response variable values for a selected quantile level of the identified plurality of quantile level values; and
for each selected quantile level, output a parameter estimate vector and a dual solution vector that describe the quantile function in association with the selected quantile level for use in predicting a new quantile value of a response variable for a new explanatory vector not read from the dataset.

2. The non-transitory computer-readable medium of claim 1, wherein the quantile regression solver is selected from the group consisting of a simplex algorithm, an interior-point algorithm, a smoothing algorithm, a randomized algorithm, and a majorization-minimization algorithm.

3. The non-transitory computer-readable medium of claim 1, wherein the plurality of quantile level values is a list of quantile level values.

4. The non-transitory computer-readable medium of claim 3, wherein the list of quantile level values is received as a user input through a user interface.

5. The non-transitory computer-readable medium of claim 1, wherein the plurality of quantile level values is computed from a resolution level received as a user input through a user interface.

6. The non-transitory computer-readable medium of claim 1, wherein the lower counterweight vector is computed using $(y^L, x^L) = \Sigma_{j \in L}(y_j, x_j)$, where L is a lower subset defined by assigning the plurality of observation vectors into the lower subset based on $y_j < x_j \beta(\tau)$ where $y_j$ is the response variable value of the associated observation vector, $x_j$ is the explanatory vector of the associated observation vector, and $\beta(\tau)$ is the parameter estimate vector.

7. The non-transitory computer-readable medium of claim 6, wherein the upper counterweight vector is computed using $(y^U, x^U) = \Sigma_{j \in U}(y_j, x_j)$, where U is an upper subset assigned based on $y_j > x_j \beta(\tau)$.

8. The non-transitory computer-readable medium of claim 7, wherein $D = \{j: j \notin L \text{ and } j \notin U \text{ for } j = 1, \ldots, n\}$ is a next subset of the recursive fit, where n is a number of observation vectors included in the read dataset.

9. The non-transitory computer-readable medium of claim 1, wherein the quantile regression solver is fit using maximize $\Sigma_{j \in D} a_j y_j$ subject to $\Sigma_{j \in D} a_j x_j = (1-\tau)(x_L + \Sigma_{j \in D} x_j) - \tau x^U$ $0 \leq a_j \leq 1$ for $j \in D$, where $a_j$ is the dual solution vector of the associated observation vector of the subset of observation vectors D, $y_j$ is the response variable value of the associated observation vector of the subset, $x_j$ is the explanatory vector of the associated observation vector of the subset, and $\tau$ is the selected quantile level, based on $\hat{a}_j = 1$ for the subset of observation vectors that satisfy $y_j > x_j \hat{\beta}(\tau)$, $\hat{a}_j = 0$ for the subset of observation vectors that satisfy $y_j < x_j \hat{\beta}(x)$, and $0 \leq \hat{a}_j \leq 1$ for the subset of observation vectors that satisfy $y_j = x_j \hat{\beta}(\tau)$, where $\beta(\tau)$ is the parameter estimate vector of the associated observation vector of the subset, where $\{\hat{a}_j : j \in D\}$ denote a fit $\{a_j : j \in D\}$.

10. The non-transitory computer-readable medium of claim 1, wherein recursively performing the dividing, computing, and fitting of the quantile regression solver comprise computer-readable instructions that cause the computing device to:
define the read dataset as a set of observation vectors $D_1$;
initialize a first counter value i, a second counter value t, the upper counterweight vector $(y_1^U, x_1^U)$, the lower counterweight vector $(y_1^L, x_1^L)$, a minimum quantile level value $\tau_1^L$, and a maximum quantile level value $\tau_1^U$;
define a set of quantile level values $G_1$ as the identified plurality of quantile level values;
(a) select a quantile level value $\tau_i^*$ from $G_i$ that has a closest quantile level value to $(\tau_i^L + \tau_i^U)/2$;
(b) fit the quantile regression solver to the set of observation vectors $D_i$, the lower counterweight vector, and the upper counterweight vector to describe the quantile function of the response variable at the selected quantile level value $\tau_i^*$;
(c) output the parameter estimate vector and the dual solution vector that describe the quantile function in association with the selected quantile level value $\tau_i^*$;
(d) partition $G_i$ into a lower sub grid $G_{2i}$ that includes zero or more quantile level values that are strictly less than $\tau_i^*$ and an upper sub grid $G_{2i+1}$ that includes zero or more quantile level values that are strictly greater than $\tau_i^*$;
(e) update $\tau_{2i}^L = \tau_i^L$, $\tau_{2i}^U = \tau_{2i+1}^L = \tau_i^*$, and $\tau_{2i+1}^U = \tau_i^U$;
(f) assign observation vectors of $D_i$ into $D_{2i} = \{j: \hat{a}_{ji} < 1, j \in D_i\}$ and $D_{2i+1} = \{j: \hat{a}_{ji} > 0, j \in D_i\}$, where $D_i$ and $D_{2i+1}$ are each a subset of the subsets of the plurality of observation vectors, where $\hat{a}_{ji}$ is the dual solution vector for a respective observation vector j;
(g) compute $(y_{2i}^L, x_{2i}^L) = (y_i^L, x_i^L)$, $(y_{2i}^U, x_{2i}^U) = (y_i^U, x_i^U) + \Sigma_{\{j: \hat{a}_{ji}=1, j \in D_i\}}(y_j, x_j)$, $(y_{2i+1}^L, x_{2i+1}^L) = (y_i^L, x_i^L) + \Sigma_{\{j: \hat{a}_{ji}=0, j \in D_i\}}(y_j, x_j)$, and $(y_{2i+1}^U, x_{2i+1}^U) = (y_i^U, x_i^U)$;
(h) increment the first counter value i;
when $G_i$ is an empty set, repeat (h) to (i); and
when $G_i$ is not an empty set, increment the second counter value t, and repeat (a) to (j) until t=q, where q is a number of quantile level values included in the identified plurality of quantile level values.

11. The non-transitory computer-readable medium of claim 1, wherein recursively performing the dividing, computing, and fitting comprises computer-readable instructions that cause the computing device to:
define the read dataset as a set of observation vectors $D_I$;
define a set of quantile level values $G_I$ as the identified plurality of quantile level values;
identify a set of computing devices as $C_I = \{c_1, c_2, \ldots, c_w\}$, where w is a number of computing devices of a plurality of computing node devices;
initialize the upper counterweight vector $(y^U, x^U)$, the lower counterweight vector $(y^L, x^L)$, a minimum quantile level value $\tau^L$, and a maximum quantile level value $\tau^U$; and
call a regression fit function with $D_I$, $G_I$, $C_I$, $\{(y_j, x_j): j \in D_I\}$, $(y^L, x^L)$, $(y^U, x^U)$, $\tau^L$, and $\tau^U$ provided as input parameters.

12. The non-transitory computer-readable medium of claim 11, wherein the plurality of computing node devices successively call the regression fit function with a subset of the plurality of computing node devices, a decreasing subset of the identified plurality of quantile level values, and a decreasing subset of the set of observation vectors D so that recursively performing the dividing, computing, and fitting of the quantile regression solver is performed using each of the plurality of computing node devices and the computing device.

13. The non-transitory computer-readable medium of claim 11, wherein the regression fit function comprises computer-readable instructions that cause the computing device and the plurality of computing node devices to:
   initialize $D_c$, $G_c$, $C_c$, $\{(y_j, x_j):j \in D_c\}$, $(y_c^L, x_c^L)$, $(y_c^U, x_c^U)$, $\tau_c^L$, and $\tau_c^U$ using the provided input parameters, where $D_c = D_k$, $G_c = G_k$, $C_c = C_k$, where k=1, 2, or I;
   select the quantile level value $\tau_c^*$ from $G_c$ that has a closest quantile level value to $(\tau_c^L + \tau_c^U)/2$;
   fit the quantile regression solver to the set of observation vectors $\{(y_j, x_j):j \in D_c\}$, the lower counterweight vector $(y_c^L, x_c^L)$, and the upper counterweight vector $(y_c^U, x_c^U)$ to describe the quantile function of the response variable at the selected quantile level value $\tau_c^*$;
   output the parameter estimate vector $\hat{\beta}$ (x) and the dual solution vector $\{\hat{a}_j: j \in D_c\}$ that describe the quantile function of the response variable in association with $\tau_c^*$;
   partition $G_c$ into a lower sub grid $G_1$ that includes zero or more quantile level values that are strictly less than $\tau_c^*$ and an upper sub grid $G_2$ that includes zero or more quantile level values that are strictly greater than $\tau_c^*$;
   update $\tau_1^L = \tau_c^L$, $\tau_1^U = \tau_2^L = \tau_c^*$, and $\tau_2^U = \tau_c^U$;
   assign observation vectors of $D_c$ into $D_1 = \{j \in D_c: \hat{a}_j < 1\}$ and $D_2 = \{j \in D_c: \hat{a}_j > 0\}$, where $D_1$ and $D_2$ are each a subset of the subsets of the plurality of observation vectors, where $\hat{a}_j$ is the dual solution vector for a respective observation vector j;
   partition $C_c$ into a first subset of computing node devices $C_1$ and a second subset of computing node devices $C_2$;
   compute $(y_1^L, x_1^L) = (y_c^L, x_c^L)$, $(y_1^U, x_1^U) = (y_c^U, x_c^U) + \Sigma_{\{j \in D_c: \hat{a}_j = 1\}}(y_j, x_j)$, $(y_2^L, x_2^L) = (y_c^L, x_c^L) + \Sigma_{\{j \in D_c: \hat{a}_j = 0\}}(y_j, x_j)$, and $(y_2^U, x_2^U) = (y_c^U, x_c^U)$;
   when $G_1$ is not an empty set, recursively call the regression fit function with $D_1$, $G_1$, $C_1$, $\{(y_j, x_j):j \in D_1\}$, $(y_1^L, x_1^L)$, $(y_1^U, x_1^U)$, $\tau_1^L$, and $\tau_1^U$ provided as the input parameters;
   when $G_2$ is not an empty set, recursively call the regression fit function with $D_2$, $G_2$, $C_2$, $\{(y_j, x_j):j \in D_2\}$, $(y_2^L, x_2^L)$, $(y_2^U, x_2^U)$, $\tau_2^L$, and $\tau_2^U$ provided as the input parameters; and
   return control to the calling regression fit function.

14. A computing device comprising:
   a processor; and
   a non-transitory computer-readable medium operably coupled to the processor, the computer-readable medium having computer-readable instructions stored thereon that, when executed by the processor, cause the computing device to
   read a dataset that includes a plurality of observation vectors, wherein each observation vector includes a response variable value and an explanatory vector of a plurality of explanatory variable values;
   identify a plurality of quantile level values;
   recursively perform,
      the read dataset into subsets of the plurality of observation vectors;
      computing a lower counterweight vector and an upper counterweight vector for each of the subsets; and
      fitting a quantile regression solver to each of the subsets using the computed lower counterweight vector associated with each subset of the subsets and the computed upper counterweight vector associated with each subset of the subsets to describe a quantile function for the response variable values for a selected quantile level of the identified plurality of quantile level values; and
   for each selected quantile level, output a parameter estimate vector and a dual solution vector that describe the quantile function in association with the selected quantile level for use in predicting a new quantile value of a response variable for a new explanatory vector not read from the dataset.

15. The computing device of claim 14, wherein the lower counterweight vector is computed using $(y^L, x^L) = \Sigma_{j \in L}(y_j, x_j)$, where L is a lower subset defined by assigning the plurality of observation vectors into the lower subset based on $y_j < x_j \beta(\tau)$ where $y_j$ is the response variable value of the associated observation vector, $x_j$ is the explanatory vector of the associated observation vector, and $\beta(\tau)$ is the parameter estimate vector.

16. The computing device of claim 15, wherein the upper counterweight vector is computed using $(y^U, x^U) = \Sigma_{j \in U}(y^j, x^j)$, where U is an upper subset assigned based on $y_j > x_j \beta(\tau)$.

17. The computing device of claim 14, wherein recursively performing the dividing, computing, and fitting of the quantile regression solver comprise computer-readable instructions that cause the computing device to:
   define the read dataset as a set of observation vectors $D_1$;
   initialize a first counter value i, a second counter value t, the upper counterweight vector $(y_1^U, x_1^U)$, the lower counterweight vector $(y_1^L, x_1^L)$, a minimum quantile level value $\tau_1^L$, and a maximum quantile level value $\tau_1^U$;
   define a set of quantile level values $G_1$ as the identified plurality of quantile level values;
   (a) select a quantile level value $\tau_i^*$ from $G_i$ that has a closest quantile level value to $(\tau_i^L + \tau_i^U)/2$;
   (b) fit the quantile regression solver to the set of observation vectors $D_i$, the lower counterweight vector, and the upper counterweight vector to describe the quantile function of the response variable at the selected quantile level value $\tau_i^*$;
   (c) output the parameter estimate vector and the dual solution vector that describe the quantile function in association with the selected quantile level value $\tau_i^*$;
   (d) partition $G_i$ into a lower sub grid $G_{2i}$ that includes zero or more quantile level values that are strictly less than x, and an upper sub grid $G_{2i+1}$ that includes zero or more quantile level values that are strictly greater than $\tau_i^*$;
   (e) update $\tau_{2i}^L = \tau_i^L$, $\tau_{2i}^U = \tau_{2i+1}^L = \tau_i^*$, and $\tau_{2i+1}^U = \tau_i^U$;
   (f) assign observation vectors of $D_i$ into $D_{2i} = \{j: \hat{a}_{ji} < 1, j \in D_i\}$ and $D_{2i+1} = \{j: \hat{a}_{ji} > 0, j \in D_i\}$, where $D_i$ and $D_{2i+1}$ are each a subset of the subsets of the plurality of observation vectors, where $\hat{a}_{ji}$ is the dual solution vector for a respective observation vector;
   (g) compute $(y_{2i}^L, x_{2i}^L) = (y_i^L, x_i^L)$, $(y_{2i}^U, x_{2i}^U) = (y_i^U, x_i^U) + \Sigma_{\{j: \hat{a}_{ji}=1, j \in Di\}}(y_j, x_j)$, $(y_{2i+1}^L, x_{2i+1}^L) = (y_i^L, x_i^L) + \Sigma_{\{j: \hat{a}_{ji}=0, j \in Di\}}(y_j, x_j)$, and $(y_{2i+1}^U, x_{2i+1}^U) = (y_i^U, x_i^U)$;
   (h) increment the first counter value i;
   (i) when $G_i$ is an empty set, repeat (h) to (i); and
   when $G_i$ is not an empty set, increment the second counter value t, and repeat (a) to (j) until t=q, where q is a number of quantile level values included in the identified plurality of quantile level values.

18. A method of computing a plurality of quantile regression solvers for a dataset at a plurality of quantile levels, the method comprising:
  reading, by a computing device, a dataset that includes a plurality of observation vectors, wherein each observation vector includes a response variable value and an explanatory vector of a plurality of explanatory variable values;
  identifying, by the computing device, a plurality of quantile level values;
  recursively performing,
    dividing, by the computing device, the read dataset into subsets of the plurality of observation vectors;
    computing, by the computing device, a lower counterweight vector and an upper counterweight vector for each of the subsets; and
    fitting, by the computing device, a quantile regression solver to each of the subsets using the computed lower counterweight vector associated with each subset of the subsets and the computed upper counterweight vector associated with each subset of the subsets to describe a quantile function for the response variable values for a selected quantile level of the identified plurality of quantile level values; and
  for each selected quantile level, outputting, by the computing device, a parameter estimate vector and a dual solution vector that describe the quantile function in association with the selected quantile level for use in predicting a new quantile value of a response variable for a new explanatory vector not read from the dataset.

19. The method of claim 18, wherein the quantile regression solver is selected from the group consisting of a simplex algorithm, an interior-point algorithm, a smoothing algorithm, a randomized algorithm, and a majorization-minimization algorithm.

20. The method of claim 18, wherein the plurality of quantile level values is a list of quantile level values.

21. The method of claim 20, wherein the list of quantile level values is received as a user input through a user interface.

22. The method of claim 18, wherein the plurality of quantile level values is computed from a resolution level received as a user input through a user interface.

23. The method of claim 18, wherein the lower counterweight vector is computed using $(y^L, x^L) = \sum_{j \in L}(y_j, x_j)$, where L is a lower subset defined by assigning the plurality of observation vectors into the lower subset based on $y_j < x_j \beta(\tau)$ where $y_j$ is the response variable value of the associated observation vector, $x_j$ is the explanatory vector of the associated observation vector, and $\beta(\tau)$ is the parameter estimate vector.

24. The method of claim 23, wherein the upper counterweight vector is computed using $(y^U, x^U) = \sum_{j \in U}(y^j, x^j)$, where U is an upper subset assigned based on $y_j > x_j \beta(\tau)$.

25. The method of claim 24, wherein $D = \{j : j \notin L \text{ and } j \notin U \text{ for } j = 1, \ldots, n\}$ is a next subset of the observation vectors, where n is a number of observation vectors included in the read dataset.

26. The method of claim 18, wherein the quantile regression solver is fit using maximize $\Sigma_{j \in D} a_j y_j$ subject to $\Sigma_{j \in D} a_j x_j = (1-\tau)(x^L + \Sigma_{j \in D} x_j) - \tau x^U$ $0 \le a_j \le 1$ for $j \in D$, where $a_j$ is the dual solution vector of the associated observation vector of the subset of observation vectors D, $y_j$ is the response variable value of the associated observation vector of the subset, $x_j$ is the explanatory vector of the associated observation vector of the subset, and $\tau$ is the selected quantile level, based on $\hat{a}_j = 1$ for the subset of observation vectors that satisfy $y_j > x_j \beta(\tau)$, $\hat{a}_j = 0$ for the subset of observation vectors that satisfy $y_j < x_j \beta(\tau)$, and $0 \le \hat{a}_j \le 1$ for the subset of observation vectors that satisfy $y_j = x_j \beta(\tau)$, where $\beta(\tau)$ is the parameter estimate vector of the associated observation vector of the subset, where $\{\hat{a}_j : j \in D\}$ denote a fit $\{a_j : j \in D\}$.

27. The method of claim 18, wherein recursively performing the dividing, computing, and fitting of the quantile regression solver comprises:
  defining, by the computing device, the read dataset as a set of observation vectors $D_1$;
  initializing, by the computing device, a first counter value i, a second counter value t, the upper counterweight vector $(y_1^U, x_1^U)$, the lower counterweight vector $(y_1^L, x_1^L)$, a minimum quantile level value $\tau_1^L$, and a maximum quantile level value $\tau_1^U$;
  defining, by the computing device, a set of quantile level values $G_1$ as the identified plurality of quantile level values;
  (a) selecting, by the computing device, a quantile level value $\tau_i^*$ from $G_i$ that has a closest quantile level value to $(\tau_i^L + \tau_i^U)n/2$;
  (b) fitting, by the computing device, the quantile regression solver to the set of observation vectors $D_i$, the lower counterweight vector, and the upper counterweight vector to describe the quantile function of the response variable at the selected quantile level value $\tau_i^*$;
  (c) outputting, by the computing device, the parameter estimate vector and the dual solution vector that describe the quantile function in association with the selected quantile level value $\tau_i^*$;
  (d) partitioning, by the computing device, $G_i$ into a lower sub grid $G_{2i}$ that includes zero or more quantile level values that are less than or equal to $\tau_i^*$, and an upper sub grid $G_{2i+1}$ that includes zero or more quantile level values that are greater than or equal to $\tau_i^*$;
  (e) updating, by the computing device, $\tau_{2i}^L = \tau_i^L$, $\tau_{2i}^U = \tau_{2i+1}^L = \tau_i^*$, and $\tau_{2i+1}^U = \tau_i^U$;
  (f) assigning, by the computing device, observation vectors of $D_i$ into $D_{2i} = \{j : \hat{a}_{ji} < 1, j \in D_i\}$ and $D_{2i+1} = \{j : \hat{a}_{ji} > 0, j \in D_i\}$, where $D_i$ and $D_{2i+1}$ are each a subset of the subsets of the plurality of observation vectors, where $\hat{a}_{ji}$ is the dual solution vector for a respective observation vector;
  (g) computing, by the computing device, $(y_{2i}^L, x_{2i}^L) = (y_i^L, x_i^L)$, $(y_{2i}^U, x_{2i}^U) = (y_i^U, x_i^U) + \tau_{\{j : \hat{a}_{ji} = 1, j \in D_i\}}(y_j, x_j)$, $(y_{2i+1}^L, x_{2i+1}^L) = (y_i^L, x_i^L) + \tau_{\{j : \hat{a}_{ji} = 0, j \in D_i\}}(y_j, x_j)$, and $(y_{2i+1}^U, x_{2i+1}^U) = (y_i^U, x_i^U)$;
  (h) incrementing, by the computing device, the first counter value i;
  (i) when $G_i$ is an empty set, repeating, by the computing device, (h) to (i); and
  (j) when $G_i$ is not an empty set, incrementing, by the computing device, the second counter value t, and repeating, by the computing device, (a) to (j) until t=q, where q is a number of quantile level values included in the identified plurality of quantile level values.

28. The method of claim 18, wherein recursively performing the dividing, computing, and fitting comprises:
  defining, by the computing device, the read dataset as a set of observation vectors $D_I$;
  defining, by the computing device, a set of quantile level values $G_I$ as the identified plurality of quantile level values;

identifying, by the computing device, a set of computing devices as $C_I=\{c_1, c_2, \ldots, c_w\}$, where w is a number of computing devices of a plurality of computing node devices;

initializing, by the computing device, the upper counterweight vector $(y^U, x^U)$, the lower counterweight vector $(y^L, x^L)$, a minimum quantile level value $\tau^L$, and a maximum quantile level value $\tau^U$; and calling, by the computing device, a regression fit function with $D_I$, $G_I$, $C_I$, $\{(y_j, x_j):j \in D_I\}$, $(y^L, x^L)$, $(x^U, x^Y)$, $\tau^L$, and $\tau^U$ provided as input parameters.

29. The method of claim 28, wherein the plurality of computing node devices successively call the regression fit function with a subset of the plurality of computing node devices, a decreasing subset of the identified plurality of quantile level values, and a decreasing subset of the set of observation vectors D so that recursively performing the dividing, computing, and fitting of the quantile regression solver is performed using each of the plurality of computing node devices and the computing device.

30. The method of claim 28, wherein the regression fit function comprises computer-readable instructions that cause the computing device and the plurality of computing node devices to:

initialize $D_c$, $G_c$, $C_c$, $\{(y_j, x_j):j \in D_c\}$, $(y_c^L, x_c^L)$, $(y_c^U, x_c^U)$, $\tau_c^L$, and $\tau_c^U$ using the provided input parameters, where $D_c=D_k$, $G_c=G_k$, $C_c=C_k$, where k=1, 2, or I;

select the quantile level value $\tau_c^*$ from $G_c$ that has a closest quantile level value to $(\tau_c^L+\tau_c^U)/2$;

fit the quantile regression solver to the set of observation vectors $\{(y_j, x_j):j \in D_c\}$, the lower counterweight vector $(y_c^L, x_c^L)$, and the upper counterweight vector $(y_c^U, x_c^U)$ to describe the quantile function of the response variable at the selected quantile level value $\tau_c^*$;

output the parameter estimate vector $\hat{\beta}(\tau_c^*)$ and the dual solution vector $\{\hat{a}_j:j \in D_c\}$ that describe the quantile function of the response variable in association with $\tau_c^*$;

partition $G_c$ into a lower sub grid $G_1$ that includes zero or more quantile level values that are strictly less than $\tau_c^*$ and an upper sub grid $G_2$ that includes zero or more quantile level values that are strictly greater than $\tau_c^*$;

update $\tau_1^L=\tau_c^L$, $\tau_1^U=\tau_2^L=\tau_c^*$, and $\tau_2^U=\tau_c^U$;

assign observation vectors of $D_c$ into $D_1=\{j \in D_c:\hat{a}_j<1\}$ and $D_2=\{j \in D_c:\hat{a}_j>0\}$, where $D_1$ and $D_2$ are each a subset of the subsets of the plurality of observation vectors, where $\hat{a}_j$ is the dual solution vector for a respective observation vector j;

partition $C_c$ into a first subset of computing node devices $C_1$ and a second subset of computing node devices $C_2$;

compute $(y_1^L, x_1^L)=(y_c^L, x_c^L)$, $(y_1^U, x_1^U)=(y_c^U, x_c^U)+\Sigma_{\{j \in D_c:\hat{a}_j=1\}}(y_j, x_j)$, $(y_2^L, x_2^L)=(y_c^L, x_c^L)+\Sigma_{\{j \in D_c:\hat{a}_j=0\}}(y_j, x_j)$, and $(y_2^U, x_2^U)=(y_c^U, x_c^U)$;

when $G_1$ is not an empty set, recursively call the regression fit function with $D_1$, $G_1$, $C_1$, $\{(y_j, x_j):j \in D_1\}$, $(y_1^L, x_1^L)$, $(y_1^U, x_1^U)$, $\tau_1^L$, and $\tau_1^U$ provided as the input parameters;

when $G_2$ is not an empty set, recursively call the regression fit function with $D_2$, $G_2$, $C_2$, $\{(y_j, x_j):j \in D_2\}$, $(y_2^L, x_2^L)$, $(y_2^U, x_2^U)$, $\tau_2^L$, and $\tau_2^U$ provided as the input parameters; and return control to the calling regression fit function.

* * * * *

UNITED STATES PATENT AND TRADEMARK OFFICE
CERTIFICATE OF CORRECTION

PATENT NO. : 11,003,733 B2
APPLICATION NO. : 15/849870
DATED : May 11, 2021
INVENTOR(S) : Yonggang Yao Page 1 of 10

It is certified that error appears in the above-identified patent and that said Letters Patent is hereby corrected as shown below:

On the Title Page

Item (54):
Delete the phrase "ANALYTIC SYSTEM FOR FAST QUANTILE REGRESSION COMPUTATION" and replace with --ANALYTIC SYSTEM FOR FAST QUANTILE REGRESSION PROCESS COMPUTATION--.

In the Specification

Column 1, Lines 1-2:
Delete the phrase "ANALYTIC SYSTEM FOR FAST QUANTILE REGRESSION COMPUTATION" and replace with --ANALYTIC SYSTEM FOR FAST QUANTILE REGRESSION PROCESS COMPUTATION--.

Column 10, Line 50:
Delete the phrase "$x_{(1/4)}^L$ ." and replace with --$x_{(1/4)}^L$ ·--.

Column 10, Line 54:
Delete the phrase "$x_{(1/2)}^U$ ." and replace with --$x_{(1/2)}^U$ ·--.

Column 10, Line 55:
Delete the phrase "$x_{(1/4)}^L$ and $x_{(1/2)}^U$," and replace with --$x_{(1/4)}^L$ and $x_{(1/2)}^U$,--.

Column 10, Line 61:
Delete the phrase "$x_{(3/8)}^L$," and replace with --$x_{(3/8)}^L$,--.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*

Column 10, Line 63:

Delete the phrase "$x_{(3/8)}{}^U$," and replace with --$x^U_{(3/8)}$,--.

Column 11, Line 12:
Delete the phrase "$0.5 < \tau_3 = 035$" and replace with --$0.5 < \tau_3 = 0.55$--.

Column 13, Lines 23-24:

Delete the phrase "$(\tau_1{}^L = 0, \tau_1{}^U = 1)$." and replace with --$(\tau_1^L = 0, \tau_1^U = 1)$.--.

Column 13, Line 25:
Delete the phrase "$(y_1{}^L, x_1{}^L) = (y_1{}^U, x_1{}^U) = (0,0)$." and replace with
--$(y_1^L, x_1^L) = (y_1^U, x_1^U) = (0, 0)$.--.

Column 13, Line 30:

Delete the phrase "$\tau_i{}^*$" and replace with --$\tau_i^*$--.

Column 13, Lines 62-63:

Delete the phrase "$(y_i{}^L, x_i{}^L)$ and $(y_i{}^U, x_i{}^U)$" and replace with --$(y_i^L, x_i^L)$ and $(y_i^U, x_i^U)$--.

Column 14, Lines 24-25:

Delete the phrase "$\hat{\beta}(\tau_i^*)$, the dual solution vector $\{\hat{a}_j(\tau_i^*): j \in D_i\}$," and replace with --$\hat{\beta}(\tau_i^*)$, the dual solution vector $\{\hat{a}_j(\tau_i^*): j \in D_i\}$,--.

Column 14, Line 28:

Delete the phrase "$\tau_i^*$." and replace with --$\tau_i^*$·--.

Column 14, Line 37:

Delete the phrase "$\tau_i{}^*$" and replace with --$\tau_i^*$--.

Column 14, Lines 38-39:

Delete the phrase "$(\tau_{2i}{}^L = \tau_i{}^L, \tau_{2i}{}^U = \tau_i{}^*)$;" and replace with --$(\tau_{2i}^L = \tau_i^L, \tau_{2i}^U = \tau_i^*)$;--.

Column 14, Lines 39-40:

Delete the phrase "$(\tau_{2i+1}{}^L = \tau_i{}^*, \tau_{2i+1}{}^U = \tau_i{}^U)$." and replace with --$(\tau_{2i+1}^L = \tau_i^*, \tau_{2i+1}^U = \tau_i^U)$.--.

Column 14, Line 57:

Delete the phrase "$D_{2i} = \{j \in D_i: \hat{a}_j(\tau_i^*) < 1\}$ and $D_{2i+1} = \{j \in D_i: \hat{a}_j(\tau_i^*) > 0\}$," and replace with --$D_{2i} = \{j \in D_i: \hat{a}_j(\tau_i^*) < 1\}$ and $D_{2i+1} = \{j \in D_i: \hat{a}_j(\tau_i^*) > 0\}$.--.

CERTIFICATE OF CORRECTION (continued)
U.S. Pat. No. 11,003,733 B2

Column 16, Line 23:
Delete the phrase "quantile $v/2^6$," and replace with --quantile $v/2^b$,--.

Column 16, Line 30:
Delete the phrase "$\sqrt{\frac{\sum_{v=1,3,\ldots,2} b-1(\hat{\beta}_{fv}-\hat{\beta}_{cv})'(\hat{\beta}_{fv}-\hat{\beta}_{cv})}{qp}}$" and replace with
--$\sqrt{\frac{\sum_{v=1,3,\ldots,2b-1}(\hat{\beta}_{fv}-\hat{\beta}_{cv})'(\hat{\beta}_{fv}-\hat{\beta}_{cv})}{qp}}$--.

Column 24, Line 50:
Delete the phrase "$\tau_1^L = \tau^L, \tau_1^U = \tau^*, \tau_2^L = \tau^*$, and $\tau_1^U = \tau^U$." and replace with
--$\tau_1^L = \tau^L, \tau_1^U = \tau^*, \tau_2^L = \tau^*$, and $\tau_2^U = \tau^U$--.

Column 24, Lines 63-65:
Delete the phrase
"$(y_1^L, x_1^L) = (y^L, x^L), (y_1^U, x_1^U) = (y^U, x^U) + \sum_{\{j \in D: \hat{a}_j=1\}} (y_j, x_j), (y_2^L, x_2^L) = (y^L, x^L) + \sum_{\{j \in D: \hat{a}_j=0\}} (y_j, x_j)$, and $(y_2^U, x_2^U) = (y^U, x^U)$." and replace with
--$(y_1^L, x_1^L) = (y^L, x^L), (y_1^U, x_1^U) = (y^U, x^U) + \sum_{\{j \in D: \hat{a}_j=1\}} (y_j, x_j), (y_2^L, x_2^L) = (y^L, x^L) + \sum_{\{j \in D: \hat{a}_j=0\}} (y_j, x_j)$ and $(y_2^U, x_2^U) = (y^U, x^U)$.--.

Column 25, Lines 5-7:
Delete the phrase
"$(y_1^L, x_1^L) = (y^L, x^L), (y_1^U, x_1^U) = (y^U, x^U) + \sum_{\{j \in D: \hat{a}_j=1\}} (y_j, x_j)$, and for $G_2$ using $(y_2^L, x_2^L) = (y^L, x^L) + \sum_{\{j \in D: \hat{a}_j=0\}} (y_j, x_j)$, and $(y_2^U, x_2^U) = (y^U, x^U)$." and replace with
--$(y_1^L, x_1^L) = (y^L, x^L), (y_1^U, x_1^U) = (y^U, x^U) + \sum_{\{j \in D: \hat{a}_j=1\}} (y_j, x_j)$, and for $G_2$ using $(y_2^L, x_2^L) = (y^L, x^L) + \sum_{\{j \in D: \hat{a}_j=0\}} (y_j, x_j)$, and $(y_2^U, x_2^U) = (y^U, x^U)$.--.

Column 25, Lines 17-18:
Delete the phrase "FastFit$(D_1, G_1, C_1, \{(y_j, x_j): j \in D_1\}, (y_1^L, x_1^L), (y_1^U, x_1^U), \tau_1^L, \tau_1^U)$." and replace with --FastFit$(D_2, G_2, C_2, \{(y_j, x_j): j \in D_2\}, (y_2^L, x_2^L), (y_2^U, x_2^U), \tau_2^L, \tau_2^U)$.--.

Column 25, Lines 28-29:
Delete the phrase "FastFit$(D_2, G_2, C_2, \{(y_j, x_j): j \in D_1\}, (y_2^L, x_2^L), (y_2^U, x_2^U), \tau_2^L, \tau_2^U)$." and replace with --FastFit$(D_2, G_2, C_2, \{(y_j, x_j): j \in D_2\}, (y_2^L, x_2^L), (y_2^U, x_2^U), \tau_2^L, \tau_2^U)$.--.

Column 25, Line 53:
Delete the phrase "$\tau_1^L = 0, \tau_1^U = 0.5$," and replace with --$\tau_1^L = 0, \tau_1^U = 0.5$,--.

Column 25, Line 56:
Delete the phrase "$\tau_2{}^L = 0.5, \tau_2{}^U = 1,$" and replace with --$\tau_2^L = 0.5, \tau_2^U = 1,$--.

Column 25, Line 60:
Delete the phrase "$\tau_1{}^L = 0.5, \tau_1{}^U = 0.7,$" and replace with --$\tau_1^L = 0.5, \tau_1^U = 0.7,$--.

Column 25, Line 63:
Delete the phrase "$\tau_2{}^L = 0.7, \tau_2{}^U = 1,$" and replace with --$\tau_2^L = 0.7, \tau_2^U = 1,$--.

Column 26, Line 1:
Delete the phrase "$\tau_1{}^L = 0.5, \tau_1{}^U = 0.7,$" and replace with --$\tau_1^L = 0.5, \tau_1^U = 0.7,$--.

In the Claims

Claim 6, Column 27, Line 44:
Delete the phrase "$y_j < x_1\beta(\tau)$" and replace with --$y_j < x_j\beta(\tau)$--.

Claim 7, Column 27, Line 51:
Delete the phrase "$y_j < x_1\beta(\tau).$" and replace with --$y_j < x_j\beta(\tau).$--.

Claim 10, Column 28, Lines 11-14:
Delete the phrase "the upper counterweight vector ($y_1{}^U, x_1{}^U$), the lower counterweight vector ($y_1{}^L, x_1{}^L$), a minimum quantile level value $\tau_1{}^L$, and a maximum quantile level value $\tau_1{}^U$;" and replace with --the upper counterweight vector $(y_1^U, x_1^U)$, the lower counterweight vector $(y_1^L, x_1^L)$, a minimum quantile level value $\tau_1^L$, and a maximum quantile level value $\tau_1^U$;--.

Claim 10, Column 28, Line 17:
Delete the phrase "$\tau_i{}^*$" and replace with --$\tau_i^*$--.

Claim 10, Column 28, Line 18:
Delete the phrase "$(\tau_i{}^L + \tau_i{}^U)/2;$" and replace with --$(\tau_i^L + \tau_i^U)/2;$--.

Claim 10, Column 28, Line 23:
Delete the phrase "$\tau_i{}^*;$" and replace with --$\tau_i^*;$--.

Claim 10, Column 28, Line 26:
Delete the phrase "$\tau_i{}^*;$" and replace with --$\tau_i^*;$--.

Claim 10, Column 28, Line 29:
Delete the phrase "$\tau_i{}^*$" and replace with --$\tau_i^*$--.

CERTIFICATE OF CORRECTION (continued)
U.S. Pat. No. 11,003,733 B2

Claim 10, Column 28, Line 31:
Delete the phrase "$\tau_i^*$;" and replace with --$\tau_i^*$;--.

Claim 10, Column 28, Line 32:
Delete the phrase "$\tau_{2i}^L = \tau_i^L$, $\tau_{2i}^U = \tau_{2i+1}{}^L = \tau_i^*$, and $\tau_{2i+1}{}^U = \tau_i^U$;" and replace with
--$\tau_{2i}^L = \tau_i^L$, $\tau_{2i}^U = \tau_{2i+1}^L = \tau_i^*$, and $\tau_{2i+1}^U = \tau_i^U$;--.

Claim 10, Column 28, Lines 38-40:
Delete the phrase
"$(y_{2i}{}^L, x_{2i}{}^L) = (y_i{}^L, x_i{}^L), (y_{2i}{}^L, x_{2i}{}^U) = (y_i{}^U, x_i{}^U) + \sum_{\{j:\hat{a}_{ji}=1, j \in D_i\}} (y_j, x_j), (y_{2i+1}{}^L, x_{2i+1}{}^L) = (y_i{}^L, x_i{}^L) + \sum_{\{j:\hat{a}_{ji}=0, j \in D_i\}}(y_j, x_j),$ and $(y_{2i+1}{}^U, x_{2i+1}{}^U) = (y_i{}^U, x_i{}^U);$" and replace with
--$(y_{2i}^L, x_{2i}^L) = (y_i^L, x_i^L), (y_{2i}^U, x_{2i}^U) = (y_i^U, x_i^U) + \sum_{\{j:\hat{a}_{ji}=1, j \in D_i\}} (y_j, x_j), (y_{2i+1}^L, x_{2i+1}^L) = (y_i^L, x_i^L) + \sum_{\{j:\hat{a}_{ji}=0, j \in D_i\}}(y_j, x_j),$ and $(y_{2i+1}^U, x_{2i+1}^U) = (y_i^U, x_i^U);$--.

Claim 13, Column 29, Lines 11-12:
Delete the phrase "$(y_c{}^L, x_c{}^L), (y_c{}^U, x_c{}^U), \tau_c{}^L,$ and $\tau_c{}^U$" and replace with
--$(y_c^L, x_c^L), (y_c^U, x_c^U), \tau_c^L,$ and $\tau_c^U$--.

Claim 13, Column 29, Lines 15-16:
Delete the phrase "quantile level value $\tau_c^*$ from $G_c$ that has a closest quantile level value to $(\tau_c{}^L + \tau_c{}^U)/2$;" and replace with --quantile level value $\tau_c^*$ from $G_c$ that has a closest quantile level value to $(\tau_c^L + \tau_c^U)/2$;--.

Claim 13, Column 29, Lines 19-20:
Delete the phrase "$(y_c{}^L, x_c{}^L)$, and the upper counterweight vector $(y_c{}^U, x_c{}^U)$" and replace with
--$(y_c^L, x_c^L),$ and the upper counterweight vector $(y_c^U, x_c^U)$--.

Claim 13, Column 29, Line 21:
Delete the phrase "$\tau_c^*$;" and replace with --$\tau_c^*$;--.

Claim 13, Column 29, Line 22:
Delete the phrase "$\hat{\beta}(x)$" and replace with --$\hat{\beta}(\tau_c^*)$--.

Claim 13, Column 29, Line 25:
Delete the phrase "$\tau_c^*$;" and replace with --$\tau_c^*$;--.

CERTIFICATE OF CORRECTION (continued)

Claim 13, Column 29, Line 27:
Delete the phrase "$\tau_c{}^*$" and replace with --$\tau_c^*$--.

Claim 13, Column 29, Line 29:
Delete the phrase "$\tau_c{}^*$;" and replace with --$\tau_c^*$;--.

Claim 13, Column 29, Line 30:
Delete the phrase "update $\tau_i^L = \tau_c^L$, $\tau_1^U = \tau_2^L = \tau_c^*$, and $\tau_2^U = \tau_c^U$; " and replace with
--update $\tau_1^L = \tau_c^L, \tau_1^U = \tau_2^L = \tau_c^*,$ and $\tau_2^U = \tau_c^U$;--.

Claim 13, Column 29, Lines 38-40:
Delete the phrase "compute
$(y_1{}^L, x_1{}^L) = (y_c{}^L, x_c{}^L), (y_1{}^U, x_1{}^U) = (y_c{}^U, x_c{}^U) + \Sigma_{\{j \in D_c : \hat{a}_j = 1\}}(y_j, x_j), (y_2{}^L, x_2{}^L) = (y_c{}^L, x_c{}^L) + \Sigma_{\{j \in D_c : \hat{a}_j = 0\}}(y_j, x_j),$ and $(y_2{}^U, x_2{}^U) = (y_c{}^U, x_c{}^U);$," and replace with
--compute $(y_1^L, x_1^L) = (y_c^L, x_c^L), (y_1^U, x_1^U) = (y_c^U, x_c^U) + \Sigma_{\{j \in D_c : \hat{a}_j = 1\}}(y_j, x_j), (y_2^L, x_2^L) = (y_c^L, x_c^L) + \Sigma_{\{j \in D_c : \hat{a}_j = 0\}}(y_j, x_j),$ and $(y_2^U, x_2^U) = (y_c^U, x_c^U);$--.

Claim 13, Column 29, Lines 42-43:
Delete the phrase "$(y_1{}^L, x_1{}^L), (y_1{}^U, x_1{}^U), \tau_1{}^L,$ and $\tau_1{}^U$" and replace with
--$(y_1^L, x_1^L), (y_1^U, x_1^U), \tau_1^L,$ and $\tau_1^U$--.

Claim 13, Column 29, Lines 46-47:
Delete the phrase "$(y_2{}^L, x_2{}^L), (y_2{}^U, x_2{}^U), \tau_2{}^L,$ and $\tau_2{}^U$" and replace with
--$(y_2^L, x_2^L), (y_2^U, x_2^U), \tau_2^L,$ and $\tau_2^U$--.

Claim 14, Column 29, Lines 62-63:
Delete the phrase "recursively perform, the read dataset" and replace with --recursively perform, dividing the read dataset--.

Claim 16, Column 30, Lines 23-24:
Delete the phrase "$(y^U, x^U) = \Sigma_{j \in U}(y^j, x^j),$" and replace with --$(y^U, x^U) = \Sigma_{j \in U}(y_j, x_j),$--.

Claim 17, Column 30, Lines 32-35:
Delete the phrase "the upper counterweight vector $(y_1{}^U, x_1{}^U)$, the lower counterweight vector $(y_1{}^L, x_1{}^L)$, a minimum quantile level value $\tau_1{}^L$, and a maximum quantile level value $\tau_1{}^U$;" and replace with --the upper counterweight vector $(y_1^U, x_1^U)$, the lower counterweight vector $(y_1^L, x_1^L)$, a minimum quantile level value $\tau_1^L$, and a maximum quantile level value $\tau_1^U$;--.

Claim 17, Column 30, Line 38:
Delete the phrase "$\tau_i{}^*$" and replace with --$\tau_i^*$--.

Claim 17, Column 30, Line 39:
Delete the phrase "($\tau_i^L + \tau_i^U$)/2;" and replace with --$(\tau_i^L + \tau_i^U)/2$;--.

Claim 17, Column 30, Line 44:
Delete the phrase "$\tau_i^*$;" and replace with --$\tau_i^*$;--.

Claim 17, Column 30, Line 47:
Delete the phrase "$\tau_i^*$;" and replace with --$\tau_i^*$;--.

Claim 17, Column 30, Line 52:
Delete the phrase "$\tau_i^*$," and replace with --$\tau_i^*$,--.

Claim 17, Column 30, Line 53:
Delete the phrase "update $\tau_{2i}^L = \tau_i^L$, $\tau_{2i}^U = \tau_{2i+1}^L = \tau_i^*$, and $\tau_{2i+1}^U = \tau_i^U$;" and replace with --update $\tau_{2i}^L = \tau_i^L$, $\tau_{2i}^U = \tau_{2i+1}^L = \tau_i^*$, and $\tau_{2i+1}^U = \tau_i^U$;--.

Claim 17, Column 30, Lines 59-61:
Delete the phrase
"compute $(y_{2i}^L, x_{2i}^L) = (y_i^L, x_i^L), (y_{2i}^U, x_{2i}^U) = (y_i^U, x_i^U) + \sum_{\{j:\hat{a}_{ji}=1, j \in D_i\}} (y_j, x_j),$
$(y_{2i+1}^L, x_{2i+1}^L) = (y_i^L, x_i^L) + \sum_{\{j:\hat{a}_{ji}=0, j \in D_i\}} (y_j, x_j), \text{ and } (y_{2i+1}^U, x_{2i+1}^U) = (y_i^U, x_i^U);$ and replace with --compute $(y_{2i}^L, x_{2i}^L) = (y_i^L, x_i^L), (y_{2i}^U, x_{2i}^U) = (y_i^U, x_i^U) + \sum_{\{j:\hat{a}_{ji}=1, j \in D_i\}} (y_j, x_j),$
$(y_{2i+1}^L, x_{2i+1}^L) = (y_i^L, x_i^L) + \sum_{\{j:\hat{a}_{ji}=0, j \in D_i\}} (y_j, x_j), \text{ and } (y_{2i+1}^U, x_{2i+1}^U) = (y_i^U, x_i^U);$
--.

Claim 23, Column 31, Line 46:
Delete the phrase "$(y^L, x^L) = \sum_{j \in L} (y_j, x_j),$" and replace with --$(y^L, x^L) = \sum_{j \in L} (y_j, x_j),$--.

Claim 24, Column 31, Line 54:
Delete the phrase "$(y^U, x^U) = \sum_{j \in U} (y^j, x^j),$" and replace with --$(y^U, x^U) = \sum_{j \in U} (y_j, x_j),$--.

Claim 27, Column 32, Lines 13-16:
Delete the phrase "the upper counterweight vector ($y_1^U$, $x_1^U$), the lower counterweight vector ($y_1^L$, $x_1^L$), a minimum quantile level value $\tau_1^L$, and a maximum quantile level value $\tau_1^U$;" and replace with --the upper counterweight vector $(y_1^U, x_1^U)$, the lower counterweight vector $(y_1^L, x_1^L)$, a minimum quantile level value $\tau_1^L$, and a maximum quantile level value $\tau_1^U$;--.

Claim 27, Column 32, Line 22:

Delete the phrase "$\tau_i^*$" and replace with --$\tau_i^*$--.

Claim 27, Column 32, Line 23:
Delete the phrase "$(\tau_i^L + \tau_i^U)n/2$;" and replace with --$(\tau_i^L + \tau_i^U)/2;$--.

Claim 27, Column 32, Line 29:
Delete the phrase "$\tau_i^*$;" and replace with --$\tau_i^*;$--.

Claim 27, Column 32, Line 34:
Delete the phrase "$\tau_i^*$;" and replace with --$\tau_i^*;$--.

Claim 27, Column 32, Line 37:
Delete the phrase "$\tau_i^*$," and replace with --$\tau_i^*,$--.

Claim 27, Column 32, Line 39:
Delete the phrase "$\tau_i^*$;" and replace with --$\tau_i^*;$--.

Claim 27, Column 32, Lines 40-41:
Delete the phrase "$\tau_{2i}^L = \tau_i^L, \tau_{2i}^U = \tau_{2i+1}^L = \tau_i^*$, and $\tau_{2i+1}^U = \tau_i^U$;" and replace with
--$\tau_{2i}^L = \tau_i^L, \tau_{2i}^U = \tau_{2i+1}^L = \tau_i^*$, and $\tau_{2i+1}^U = \tau_i^U;$--.

Claim 27, Column 32, Lines 48-51:
Delete the phrase
"$(y_{2i}^L, x_{2i}^L) = (y_i^L, x_i^L), (y_{2i}^U, x_{2i}^U) = (y_i^U, x_i^U) + \tau_{\{j:\hat{a}_{ji}=1, j \in D_i\}}(y_j, x_j), (y_{2i+1}^L, x_{2i+1}^L) = (y_i^L, x_i^L) + \tau_{\{j:\hat{a}_{ji}=1, j \in D_i\}}(y_j, x_j),$ and $(y_{2i+1}^U, x_{2i+1}^U) = (y_i^U, x_i^U);$" and replace with --$(y_{2i}^L, x_{2i}^L) = (y_i^L, x_i^L), (y_{2i}^U, x_{2i}^U) = (y_i^U, x_i^U) + \sum_{\{j:\hat{a}_{ji}=1, j \in D_i\}}(y_j, x_j), (y_{2i+1}^L, x_{2i+1}^L) = (y_i^L, x_i^L) + \sum_{\{j:\hat{a}_{ji}=0, j \in D_i\}}(y_j, x_j),$ and $(y_{2i+1}^U, x_{2i+1}^U) = (y_i^U, x_i^U);$--.

Claim 28, Column 33, Line 10:
Delete the phrase "$D_I, G_I, C_I, \{(y_j, x_j): j \in D_I\}, (y^L, x^L), (x^U, x^Y), \tau^L,$" and replace with
--$D_I, G_I, C_I, \{(y_j, x_j): j \in D_I\}, (y^L, x^L), (y^U, x^U), \tau^L,$--.

Claim 30, Column 33, Line 28:
Delete the phrase "$\tau_c^*$" and replace with --$\tau_c^*$--.

Claim 30, Column 33, Line 29:

Delete the phrase "$(\tau_c{}^L + \tau_c{}^U)/2;$" and replace with --$(\tau_c^L + \tau_c^U)/2;$--.

Claim 30, Column 33, Lines 31-32 and Column 34, Lines 1-2:
Delete the phrase "the lower counterweight vector ($y_c{}^L$, $x_c{}^L$), and the upper counterweight vector ($y_c{}^U$, $x_c{}^U$) to describe the quantile function of the response variable at the selected quantile level value $\tau_c{}^*$;" and replace with --the lower counterweight vector $(y_c^L, x_c^L)$, and the upper counterweight vector $(y_c^U, x_c^U)$ to describe the quantile function of the response variable at the selected quantile level value $\tau_c^*;$--.

Claim 30, Column 34, Line 3:
Delete the phrase "$\hat{\beta}\ (\tau_c{}^*)$" and replace with --$\hat{\beta}\ (\tau_c^*)$--.

Claim 30, Column 34, Line 6:
Delete the phrase "$\tau_c{}^*;$" and replace with --$\tau_c^*;$--.

Claim 30, Column 34, Line 8:
Delete the phrase "$\tau_c{}^*$" and replace with --$\tau_c^*$--.

Claim 30, Column 34, Line 10:
Delete the phrase "$\tau_c{}^*;$" and replace with --$\tau_c^*;$--.

Claim 30, Column 34, Line 11:
Delete the phrase "$\tau_1{}^L = \tau_c{}^L, \tau_1{}^U = \tau_2{}^L = \tau_c{}^*$, and $\tau_2{}^U = \tau_c{}^U;$" and replace with --$\tau_1^L = \tau_c^L, \tau_1^U = \tau_2^L = \tau_c^*,$ and $\tau_2^U = \tau_c^U;$--.

Claim 30, Column 34, Lines 20-22:
Delete the phrase
"$(y_1{}^L, x_1{}^L) = (y_c{}^L, x_c{}^L), (y_1{}^U, x_1{}^U) = (y_c{}^U, x_c{}^U) + \Sigma_{\{j \in D_c: \hat{a}_j = 1\}}(y_j, x_j), (y_2{}^L, x_2{}^L) = (y_c{}^L, x_c{}^L) + \Sigma_{\{j \in D_c: \hat{a}_j = 0\}}(y_j, x_j),$ and $(y_2{}^U, x_2{}^U) = (y_c{}^U, x_c{}^U);$" and replace with
--$(y_1^L, x_1^L) = (y_c^L, x_c^L), (y_1^U, x_1^U) = (y_c^U, x_c^U) + \Sigma_{\{j \in D_c: \hat{a}_j = 1\}}(y_j, x_j), (y_2^L, x_2^L) = (y_c^L, x_c^L) + \Sigma_{\{j \in D_c: \hat{a}_j = 0\}}(y_j, x_j),$ and $(y_2^U, x_2^U) = (y_c^U, x_c^U);$--.

Claim 30, Column 34, Lines 24-25:
Delete the phrase "$D_1, G_1, C_1, \{(y_j, x_j): j \in D_1\}, (y_1{}^L, x_1{}^L), (y_1{}^U, x_1{}^U), \tau_1{}^L,$" and $\tau_1{}^U$" and replace with --$D_1, G_1, C_1, \{(y_j, x_j): j \in D_1\}, (y_1^L, x_1^L), (y_1^U, x_1^U), \tau_1^L,$ and $\tau_1^U$--.

Claim 30, Column 34, Lines 28-29:

Delete the phrase "$D_2, G_2, C_2, \{(y_j, x_j): j \in D_2\}, (y_2{}^L, x_2{}^L), (y_2{}^U, x_2{}^U), \tau_2{}^L,$ and $\tau_2{}^U$" and replace with --$D_2, G_2, C_2, \{(y_j, x_j): j \in D_2\}, (y_2^L, x_2^L), (y_2^U, x_2^U), \tau_2^L,$ and $\tau_2^U$--.